US010241754B1

(12) United States Patent
Kadarundalagi Raghuram Doss et al.

(10) Patent No.: US 10,241,754 B1
(45) Date of Patent: Mar. 26, 2019

(54) SYSTEMS AND METHODS FOR PROVIDING SUPPLEMENTAL INFORMATION WITH A RESPONSE TO A COMMAND

(71) Applicant: Amazon Technologies, Inc., Seattle, WA (US)

(72) Inventors: Srikanth Doss Kadarundalagi Raghuram Doss, Seattle, WA (US); Jeffery David Wells, Redmond, WA (US); Richard Dault, Seattle, WA (US); Benjamin Joseph Tobin, Seattle, WA (US); Mark Douglas Elders, Seattle, WA (US); Stanislava R. Vlasseva, Seattle, WA (US); Skeets Jonathan Norquist, Duvall, WA (US); Nathan Lee Bosen, Kirkland, WA (US); Ryan Christopher Rapp, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 291 days.

(21) Appl. No.: 14/869,048

(22) Filed: Sep. 29, 2015

(51) Int. Cl.
G06F 3/16 (2006.01)
G10L 15/22 (2006.01)
G10L 15/26 (2006.01)
G10L 13/027 (2013.01)

(52) U.S. Cl.
CPC ............ G06F 3/167 (2013.01); G10L 13/027 (2013.01); G10L 15/22 (2013.01); G10L 15/26 (2013.01); G10L 2015/223 (2013.01)

(58) Field of Classification Search
USPC ........................................................ 704/9, 10
See application file for complete search history.

(56) References Cited

U.S. PATENT DOCUMENTS

| 2003/0046401 | A1* | 3/2003 | Abbott | G06F 9/4443 709/228 |
| 2004/0064351 | A1* | 4/2004 | Mikurak | G06Q 10/087 705/22 |
| 2005/0221876 | A1* | 10/2005 | Van Bosch | H04W 4/02 455/575.9 |
| 2011/0231182 | A1* | 9/2011 | Weider | G06F 17/30864 704/9 |

(Continued)

Primary Examiner — Michael N Opsasnick
(74) Attorney, Agent, or Firm — Pierce Atwood LLP

(57) ABSTRACT

Systems and methods for providing supplemental information with a response to a command are provided herein. In some embodiments, audio data representing a spoken command may be received by a cloud-based information system. A response to the command may be retrieved from a category related to the context of the command. A supplemental information database may also be provided that is pre-populated with supplemental information related to an individual having a registered account on the cloud-based information system. In response to retrieving the response to the command, supplemental information may be selected from the supplemental information database to be appended to the response to the command. A message may then be generated including the response and the supplemental information appended thereto, which in turn may be converted into audio data representing the message, which may be sent to a voice-controlled electronic device of the individual.

20 Claims, 13 Drawing Sheets

(56) References Cited

U.S. PATENT DOCUMENTS

| | | | |
|---|---|---|---|
| 2012/0016678 A1* | 1/2012 | Gruber | G06F 17/3087 704/275 |
| 2012/0036016 A1* | 2/2012 | Hoffberg | G05B 15/02 705/14.58 |
| 2012/0180083 A1* | 7/2012 | Marcus | G11B 27/034 725/32 |
| 2012/0209705 A1* | 8/2012 | Ramer | G06F 17/30867 705/14.51 |
| 2014/0032294 A1* | 1/2014 | Donlan | G06Q 30/0224 705/14.17 |
| 2014/0052680 A1* | 2/2014 | Nitz | G06N 5/02 706/46 |
| 2015/0039409 A1* | 2/2015 | Marsico | G06Q 30/0217 705/14.19 |

* cited by examiner

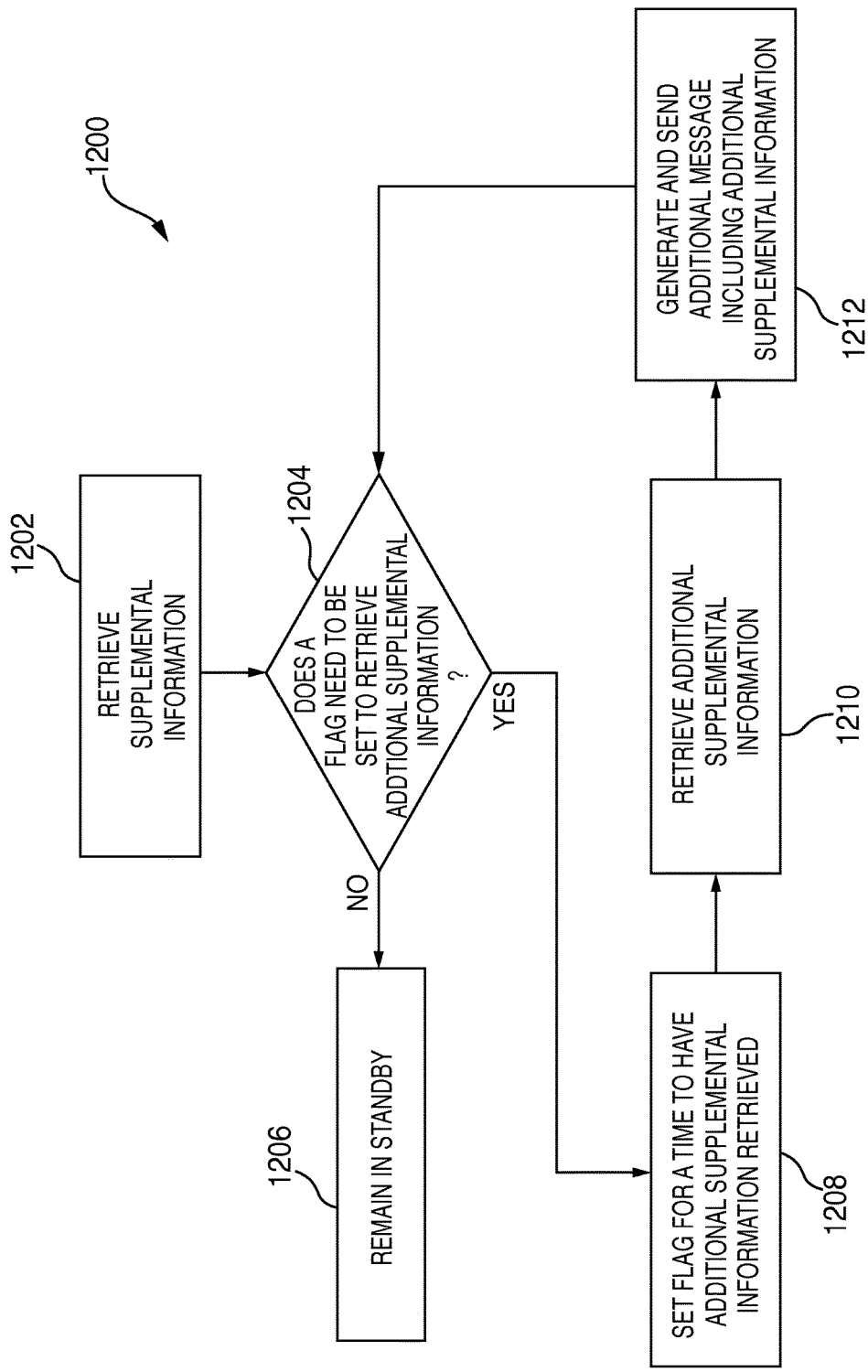

SYSTEMS AND METHODS FOR PROVIDING SUPPLEMENTAL INFORMATION WITH A RESPONSE TO A COMMAND

BACKGROUND

Individuals can interact with their electronic devices to perform a variety of basic functions, such as making phone calls to streaming content, and the capabilities and uses of these electronic devices now run the gambit of possibilities. Many electronic devices enable a user to provide a touch-based input to initiate one or more of the device's functions. Discussed herein are improvements to electronic devices and to intelligent learning of backend machines that work with these electronic devices.

BRIEF DESCRIPTION OF DRAWINGS

FIG. 12 is an illustrative flowchart of a process for retrieving additional supplemental information in response to a flag that has been set in accordance with various embodiments.

DETAILED DESCRIPTION

Figure 1:
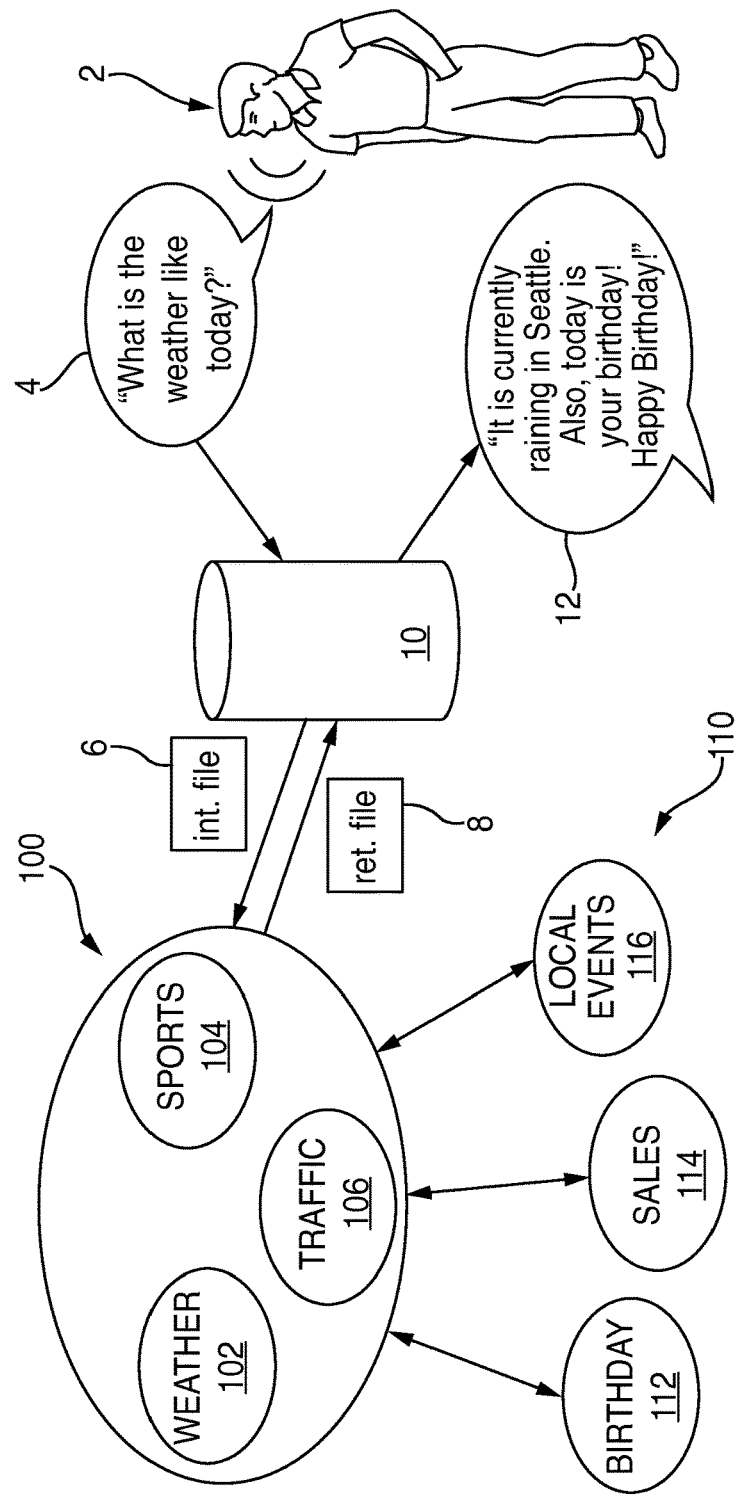
FIG. 1 is an illustrative diagram of a system for providing responses and supplemental information in response to a command spoken by an individual to a voice-controlled electronic device in accordance with various embodiments.

The present disclosure, as set forth below, is generally directed to various embodiments of systems, methods, and devices related to providing supplemental information related to an individual in response to a command made by the individual. An individual asking a question, or making a request, to a voice-controlled electronic device may be provided with one or more pieces of supplemental information based on the individual's account settings, preferences, or history, as well as the command that the individual made. Providing the individual with such supplemental information can provide a greater overall user experience for the individual, as well as increase the effectiveness and confidence between the individual and their electronic devices.

In some embodiments, an individual having a registered account on a cloud-based information system may be provided with supplemental information in response to a command spoken to a voice-controlled electronic device or in a remote environment where a voice-controlled electronic device is located. The individual may say a command to their voice-controlled electronic device, which may use one or more microphones or transducers to capture audio of the spoken command. The microphones and/or transducers may convert the audio into audio data that represents the spoken command, and may communicate the audio data to the cloud-based information system. The cloud-based information system may include various modules, which may extract the spoken command from the audio data. In addition to extracting the command from the audio data, the cloud-based information system may also extract one or more factors, such as a time/date that the audio data was received by the cloud-based information system, a time/date that the command was spoken by the individual, and/or a location of the voice-controlled electronic device that the individual spoke the command to. Persons of ordinary skill in the art will recognize that the time that the audio data was received by the cloud-based information system and the time/date that the command was spoken by the individual may be substantially the same. For example, an individual may ask "What is the weather like in Seattle today?", where the date that the question was asked is Jun. 4, 2015.

After the audio data representing the command is received by the cloud-based information system, data may be retrieved to generate a response to the command. In some embodiments, the data used to generate the response may be retrieved from a category that is related to a context of the command. For example, the cloud-based information system may include a number of databases that each correspond to a different category. Based on the context of the command, a category relating to that context may be selected and data may be retrieved from that category to generate a response. Continuing the aforementioned example, the selected category may be the "weather" category, and therefore weather information may be retrieved from the weather category.

In some embodiments, the individual's registered account on the cloud-based information system may include a supplemental information database that is related to the individual's registered account. The supplemental information database may include pieces of supplemental information that each are related to one or more preferences, settings, or characteristics of the individual's registered account, or related to one or more user profiles associated with the registered account. For example, the registered account on the cloud-based information system may be a master account with which there can be one or more corresponding user accounts. One illustrative example of this may correspond to a parent having a master account, and the parent's children each having a separate user account under the parent's master account. The parent may set one or more settings applicable to each user account, as well as one or more preferences related to a specific user account or accounts. In some embodiments, the supplemental information database may be populated by supplemental information received from various category servers. For example, a birthday category server may provide birthday messages to be used when it is determined to be an individual's birthday. The supplemental information database may be provided with supplemental information from one or more of the category servers, or may be accessed from one or more of the category servers. It should be understood that, as used herein in reference to some embodiments, the supplemental information database may be a data repository for supplemental information and/or pointers to various category servers storing supplemental information. In some embodiments, the supplemental information database may be thought of as a physical database that stores supplemental information, a logical database that obtains or retrieves supplemental information, or a combination thereof. Persons of ordinary skill in the art will recognize that the supplemental information database is not limited to being physical or logical, and any suitable method or system for storing supplemental information may be used.

The supplemental information database may also be continually updated and refined. For example, each piece of supplemental information may include an expiration time when that supplemental information is no longer valid. If a piece of supplemental information is not used or provided to the individual prior to it becoming invalid, that supplemental information may be updated and/or removed from the supplemental information database. Furthermore, the supplemental information database may track the various commands made by the individual. This may assist in refining the various pieces of supplemental information populated within the database. For example, historical information synthesized from the supplemental information database may show that each time it is raining outside, an individual instructs their voice-controlled electronic device to turn off their sprinklers. In response to the next time the individual asks their voice-controlled electronic device, "Will it rain today?" the voice-controlled electronic device may then turn the sprinklers off.

In some embodiments, supplemental information may be selected from the supplemental information database, which will be provided to the individual in response to the command that was made, and the selected supplemented information is based on the one or more factors extracted from the audio data representing the spoken command. The selected supplemental information may be appended to the response to the command, which may be converted into audio data representing an audio message that includes the response and the selected supplemental information. The audio data representing the audio message may then be sent to the voice-controlled electronic device that the individual initially spoken the command to, which may play the audio message for the individual. In some embodiments, the audio data representing the audio message may alternatively, or additionally, be sent to a different voice-controlled electronic device, a voice-controlled system (e.g., an electronic device coupled to an external microphone), and/or multiple devices (e.g., the voice-controlled electronic device and a tablet or television). Still further, in some embodiments, the audio data representing the audio message may be sent to a voice-controlled electronic device and a visual response may additionally be sent to a display device (e.g., tablet, smart phone, television, etc.).

Depending on the urgency, importance, or amount of time until the expiration date of the supplemental information, a determination may be made on how to prioritize the supplemental information. If a piece of supplemental information is urgent, for example, that supplemental information may be arranged so that it is provided to the individual prior to the response. In this particular scenario, the audio message would play the supplemental information prior to the response to the command. As an illustrative example, if there is a tornado warning, the tornado warning may be appended to a beginning of an audio message including weather information retrieved based on an individual asking "What is the weather like today?"

FIG. 1 is an illustrative diagram of a system for providing responses and supplemental information in response to a command spoken by an individual to a voice-controlled electronic device in accordance with various embodiments. In some embodiments, an individual 2 may say a command 4 to their voice-controlled electronic device 10, or in a room or volume of space where voice-controlled electronic device 10 is located. Command 4, as used herein, may refer to any question, request, comment, and/or instructions that may be spoken to voice-controlled electronic device 10. For example, individual 2 may ask, "What is the weather like today?" or "Play some music," or "Tell me a joke." Each of these commands may be spoken by individual 2 and received by voice-controlled electronic device 10, which is described in greater detail below.

Voice-controlled electronic device 10 may detect spoken command 4 using one or microphones resident thereon. The spoken command, or speech, may be made by individual 2 within any suitable environment where speech may be made. For example, the environment may be a room including voice-controlled electronic device 10, a vehicle including voice-controlled devices or systems, or any volume of real space through which audible signals may travel. After detecting command 4, device 10 may transmit initial file 6 to cloud-based information system 100. Initial file 6 may, for example, be audio data representing the command spoken, as well as one or more additional pieces of associated data. Various types of associated data that may be included with initial file 6 include, but are not limited to, a time and/or date that command 4 was detected by voice-controlled electronic device 10, a time and/or date that initial file 6 was received by from voice-controlled electronic cloud-based information system 100, a location of voice-controlled electronic device 10 (e.g., a GPS location), an IP address associated with voice-controlled electronic device 10, a type of device that voice-controlled electronic device 10 is, or any other type of associated data, or any combination thereof. For example, when individual 2 says command 4, voice-controlled electronic device 10 may obtain a GPS location of device 10 to determine where individual 2 is and a time/date (e.g., hour, minute, second, day, month, year, etc.) that command 4 was made.

Initial file 6 may be transmitted over a network, such as the Internet, to cloud-based information system 100 using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between voice-controlled electronic device 10 and cloud-based information system 100. In some embodiments, voice-controlled electronic device 10 and cloud-based information system 100 may communicate with one another via a web browser using HTTP. Various additional communication protocols may be used to facilitate communications between voice-controlled electronic device 10 and cloud-based information system 100 including but not limited to, Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Cloud-based information system 100 may, in some embodiments, include servers 102, 104, and 106, that may each correspond to a category. For example, server 102 may be a "weather" category server including one or more databases of weather information (e.g., forecasts, radar images, allergy information, etc.). As another example, server 104 may be a "sports" category server including one or more databases having various sports or sporting information (e.g., scores, teams, games, etc.). As still yet another example, server 106 may be a "traffic" category server including one or more databases including traffic information for various geographical regions (e.g., street maps, traffic alerts, traffic statuses, directional information, etc.). Although only three servers 102, 104, and 106 are included within cloud-based information system 100, persons of ordinary skill in the art will recognize that any number of servers may be included therein, and the aforementioned are merely exemplary. Cloud-based information system 100 may further include one or more processors, storage, memory, communications circuitry, and/or computer readable media (e.g., see FIG. 3A) operable to facilitate communications between servers 102, 104, and 106, as well as with one or more external devices accessing cloud-based information system 100 (e.g., voice-controlled electronic device 10). In some embodiments, cloud-based information system 100 may communicate with various external devices of a network using one or more of the aforementioned communication protocols.

Cloud-based information system 100 may, in some embodiments, be in communication with one or more additional third party category servers 110, which may correspond to various additional categories. Although third party servers 110 are shown to be external to cloud-based information system 100, this is merely illustrative, and third party servers 110 may be located within the system architecture of cloud-based information system 100. Third party category servers 110 may each include one or more databases having information stored therein related to a specific third party category. For example, server 112 may be a "birthday" third party category server, and may store information related to a birthday of individual 2, birthday information for one or more individuals having a user account in association with a registered account on cloud-based information system 100 for individual 2, or birthday information corresponding to one or more contacts of individual 2. In some embodiments, birthday third party server 112 may be in communication with a user profile module (e.g., see FIG. 3A), which is capable of storing birthday information for each user having a stored profile within a registered account on cloud-based information system 100. In this particular scenario, birthday third party server 112 may store various messages/information which may be provided to individual 2 when the user profile module determines that a user having a profile in association with the registered account has a birthday. As another example, server 114 may be a "sales" third party category server capable of storing information related to one or more content items or objects capable of being purchased that have recently been made available at a discounted or special price. Sales server 114 may store information relating to sales of items made by individual 2 on cloud-based information system 100, or items that individual 2 may be interested in purchasing that have recently had their price reduced or made available in a deal. As still another example, server 116 may correspond to a "local events" third party category server, and information corresponding to local events for a geographical location of individual 2 and/or voice-controlled electronic device 10 may be stored in a database for local events third party category server 116. In some embodiments, each category server (e.g., category servers 102, 104, and/or 106) may communicate with one another and/or with one or more third party category server (e.g., category servers 112, 114, and/or 116) using any of the aforementioned communications protocols. Cloud-based information system 100, as described herein, may correspond to any remote information system, server, or collection of servers. For example, cloud-based information system 100 may correspond to a collection of servers located within a facility, and individuals may store data on cloud-based information system 100 and/or communicate with cloud-based information system 100 using one or more of the aforementioned communications protocols.

After cloud based information system 100 analyzes and extracts a command from the audio data representing the speech made by the individual, a response to the command may be generated based on the request of the inquiry. In some embodiments, as described in greater detail below, the analysis and extraction of the audio data may include performing speech-to-text processing. Furthermore, in some embodiments, supplemental information related to the associated data sent to cloud-based information system 100 with command 4 may be retrieved from one or more category servers (e.g., servers 102, 104, and/or 106) or from one or more related category servers (e.g., servers 112, 114, and/or 116) based on the one or more factors extracted from the audio data representing the command and/or a context of the command. In some embodiments, return file 8 may include the retrieved supplemental information and response, which may be transmitted back to voice-controlled electronic device 10 using one or more of communications protocols as mentioned above. Return file 8 may include audio data representing an audio message including the response to the command and the supplemental information, which may be played on one or more speakers of voice-controlled electronic device 10 in the form of audio message 12. For example, after receiving return file 8, an audio message, "It is currently raining in Seattle. Also, today is your birthday! Happy Birthday!" may play on device 10. In some embodiments, however, return file 8 may also include data representing instructions that cause audio message 12 to play on voice-controlled electronic device 10 when received.

The entire process of individual 2 saying command 4 and then receiving message 12 may occur in a substantially small amount of time. For example, the latency between command 4 being made and message 12 being played may be small enough that individual 2 and electronic device 10 appear to be having a substantially fluid conversation. This may allow individual 2 to obtain useful responses related to their initial command, as well as useful supplemental information that may be relevant to individual 2.

Figure 2:
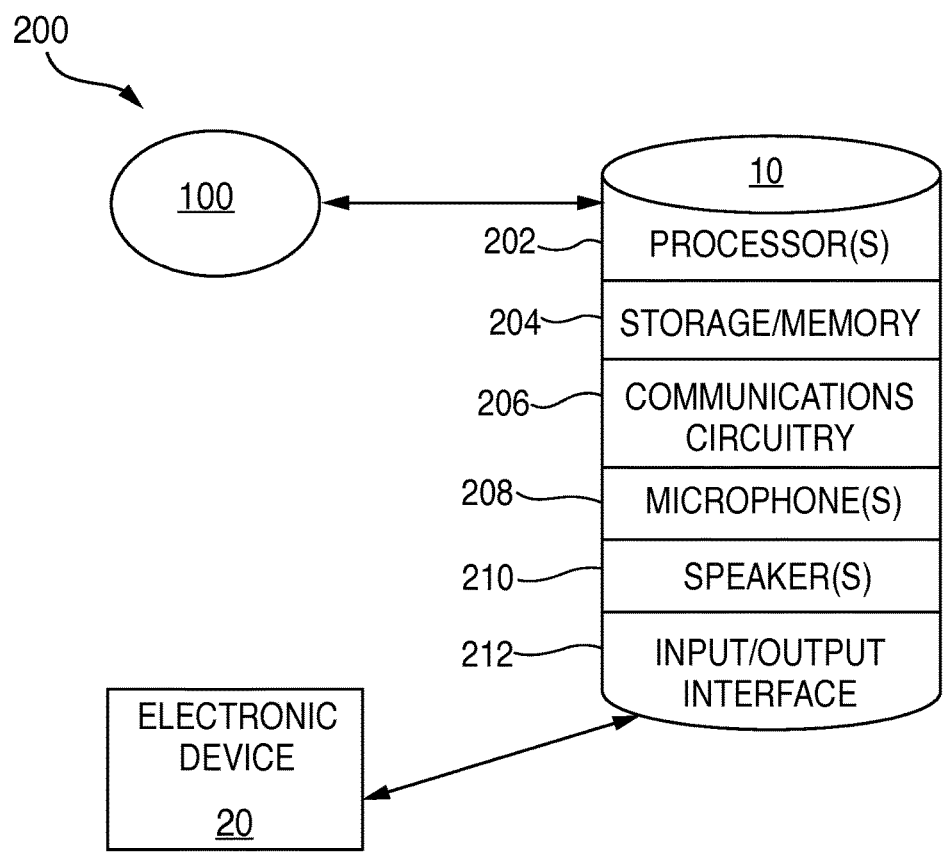
FIG. 2 is an illustrative diagram of a system in accordance with various embodiments.

FIG. 2 is an illustrative diagram of a system in accordance with various embodiments. System 200 may include voice-controlled electronic device 10, which may be in communication with cloud-based information system 100 as well as electronic device 20. In some embodiments, data communicated between voice-controlled electronic device 10, cloud-based information system 100, and/or electronic device 20 may use any suitable communications protocol, such as any of the various communication protocols described previously. Persons of ordinary skill in the art will recognize that although voice-controlled electronic device 10 is shown to be in communication with cloud-based information system 100 and electronic device 20, one or more additional or similar cloud-based information systems 100 and/or electronic devices 20 may also be included within system 200. For example, system 200 may include one or more additional electronic devices 20, which voice-controlled electronic device 10 may communicate with. As another example, system 200 may also include multiple instances of voice-controlled electronic device 10, each of which may communicate with one another as well as with cloud-based information system 100 and or electronic device 20. Persons of ordinary skill in the art will further recognize that electronic device 20 may include voice control software and/or hardware thereon, and electronic device 20 may also communicate with cloud-based information system 100 itself without using voice-controlled electronic device 10 as an intermediary.

Voice-controlled electronic device 10, in some embodiments, may correspond to any type of electronic device capable of receiving commands (e.g., audio commands, inputs) and performing one or more actions in response. Various types of electronic devices may include, but are not limited to, desktop computers, mobile computers (e.g., laptops, ultrabooks), mobile phones, smart phones, tablets, televisions, set top boxes, smart televisions, watches, bracelets, display screens, personal digital assistants ("PDAs"), smart furniture, smart household devices, smart vehicles, smart transportation devices, and/or smart accessories. In some embodiments, voice-controlled electronic device 10 may be relatively simple or basic in structure such that no mechanical input option(s) (e.g., keyboard, mouse, trackpad) or touch input(s) (e.g., touchscreen, buttons) may be provided. For example, voice-controlled electronic device 10 may be able to receive and output audio, and may include power, processing capabilities, memory/storage capabilities, and communication capabilities.

Voice-controlled electronic device 10 may include a minimal number of input mechanisms, such as a power on/off switch, however primary functionality, in one embodiment, of voice-controlled electronic device 10 may solely be through audio input and audio output. For example, voice-controlled electronic device 10 may listen for a "wake" word, or activation word, by continually monitoring local audio. In response to the wake word being detected, voice-controlled electronic device 10 may establish a connection with cloud-based information system 100, send audio data to cloud-based information system 100, and await/receive a response from cloud based information system 100. In some embodiments, however, non-voice-controlled devices may also communicate with cloud-based information system 100. For example, push-to-talk devices may additionally, or alternatively, be used within system 200.

Voice-controlled electronic device 10 may include one or more processors 202, storage/memory 204, communications circuitry 206, one or more microphones 208 or other audio input devices (e.g., transducers), one or more speakers 210 or other audio output devices, as well as an optional input/output ("I/O") interface 212. However, one or more additional components may be included within voice-controlled electronic device 10, and/or one or more components may be omitted. For example, voice-controlled electronic device 10 may include a power supply or a bus connector. As another example, voice-controlled electronic device 10 may not include an I/O interface. Furthermore, while multiple instances of one or more components may be included within voice-controlled electronic device 10, for simplicity only one of each component has been shown.

Processor(s) 202 may include any suitable processing circuitry capable of controlling operations and functionality of voice-controlled electronic device 10, as well as facilitating communications between various components within voice-controlled electronic device 10. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program modules, program data, and/or one or more operating systems. However, processor(s) 202 may run an operating system ("OS") for voice-controlled electronic device 10, and/or one or more firmware applications, media applications, and/or applications resident thereon.

Storage/memory 204 may include one or more types of storage mediums such as any volatile or non-volatile memory, or any removable or non-removable memory implemented in any suitable manner to store data on voice-controlled electronic device 10. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204.

Communications circuitry 206 may include any circuitry allowing or enabling voice-controlled electronic device 10 to communicate with one or more devices, servers, and/or systems. For example, communications circuitry 206 may facilitate communications between voice-controlled electronic device 10 and cloud-based information system 100, such as with one or more category servers 102, 104, 106 and/or third party servers 112, 114, 116, and/or with one or more additional electronic devices 20. Communications circuitry 206 may use any communications protocol, such as any of the previously mentioned exemplary communications protocols. In some embodiments, voice-controlled electronic device 10 may include an antenna to facilitate wireless communications with a network using various wireless technologies (e.g., Wi-Fi, Bluetooth®, radiofrequency, etc.). In yet another embodiment, voice-controlled electronic device 10 may include one or more universal serial bus ("USB") ports, one or more Ethernet or broadband ports, and/or any other type of hardwire access port so that communications circuitry 206 allows voice-controlled electronic device 10 to communicate with one or more communications networks.

Voice-controlled electronic device 10 may also include one or more microphones 208 and/or transducers. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, voice-controlled electronic device 10 may include multiple microphones (e.g., four, seven, ten, etc.) placed at various positions about voice-controlled electronic device 10 to monitor/capture any audio outputted about electronic device 10. The various microphones 208 may include some microphones optimized for distant sounds, while some microphones may be optimized for sounds occurring within a close range of voice-controlled electronic device 10.

Voice-controlled electronic device 10 may further include one or more speakers 210. Speaker(s) 210 may correspond to any suitable mechanism for outputting audio signals. For example, speaker(s) 210 may include one or more speaker units, transducers, arrays of speakers, and/or arrays of transducers that may be capable of broadcasting audio signals and or audio content to a surrounding area where voice-controlled electronic device 10 may be located. In some embodiments, speaker(s) 210 may include headphones or ear buds, which are wirelessly wired or hard-wired to voice-controlled electronic device 10, that may be capable of broadcasting audio directly to individual 2.

In some embodiments, voice-controlled electronic device 10 may include one or more microphones 208, which may serve as input devices to receive audio inputs, such as speech from individual 2. Voice-controlled electronic device 10, in the previously mentioned embodiment, may then also include one or more speakers 210 to output audible statements or phrases. In this manner, voice-controlled electronic device 10 may function solely through speech or audio, without the use or need for any input mechanisms or displays.

In one embodiment, voice-controlled electronic device 10 includes I/O interface 212. The input portion of I/O interface 212 may correspond to any suitable mechanism for receiving inputs from a user of voice-controlled electronic device 10. For example, a camera, keyboard, mouse, joystick, or external controller may be used as an input mechanism for I/O interface 212. The output portion of I/O interface 212 may correspond to any suitable mechanism for generating outputs from electronic device 10. For example, one or more displays may be used as an output mechanism for I/O interface 212. As another example, one or more lights, light emitting diodes ("LEDs"), or other visual indicator(s) may be used to output signals via I/O interface 212 of voice-controlled electronic device 10. In some embodiments, one or more vibrating mechanisms or other haptic feature may be included with I/O interface 212 to provide a haptic response to individual 2 from device 10. Persons of ordinary skill in the art will recognize that, in some embodiments, one or more features of I/O interface 212 may be included in a purely voice-controlled version of electronic device 10. For example, one or more LED lights may be included on voice-controlled electronic device 10 such that, when microphone(s) 208 receive audio from individual 2, the one or more LED lights become illuminated signifying that the audio has been received by voice-controlled electronic device 10.

Electronic device 20 may, in some embodiments, be substantially similar to voice-controlled electronic device 10 in that it may include one or more processors (e.g., processor(s) 202), storage and/or memory (e.g., storage/memory 204), communications circuitry (e.g., communications circuitry 206), one or more microphones (e.g., microphone(s) 208), one or more speakers (e.g., speaker(s) 210), and an input/output interface (e.g., I/O interface 212). For example, electronic device 20 may correspond to a smart television or tablet operable to display content received by electronic device 20, received from voice-controlled electronic device 10, and/or received from cloud-based information system 100. In some embodiments, an I/O interface on electronic device 20 may include a display screen and/or touch screen of electronic device 20, which may be any size and/or shape and may be located at any portion of electronic device 20. Various types of displays for electronic device 20 may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen for electronic device 20 may, in some embodiments, correspond to a display screen including capacitive sensing panels capable of recognizing touch inputs thereon.

Figure 3A:
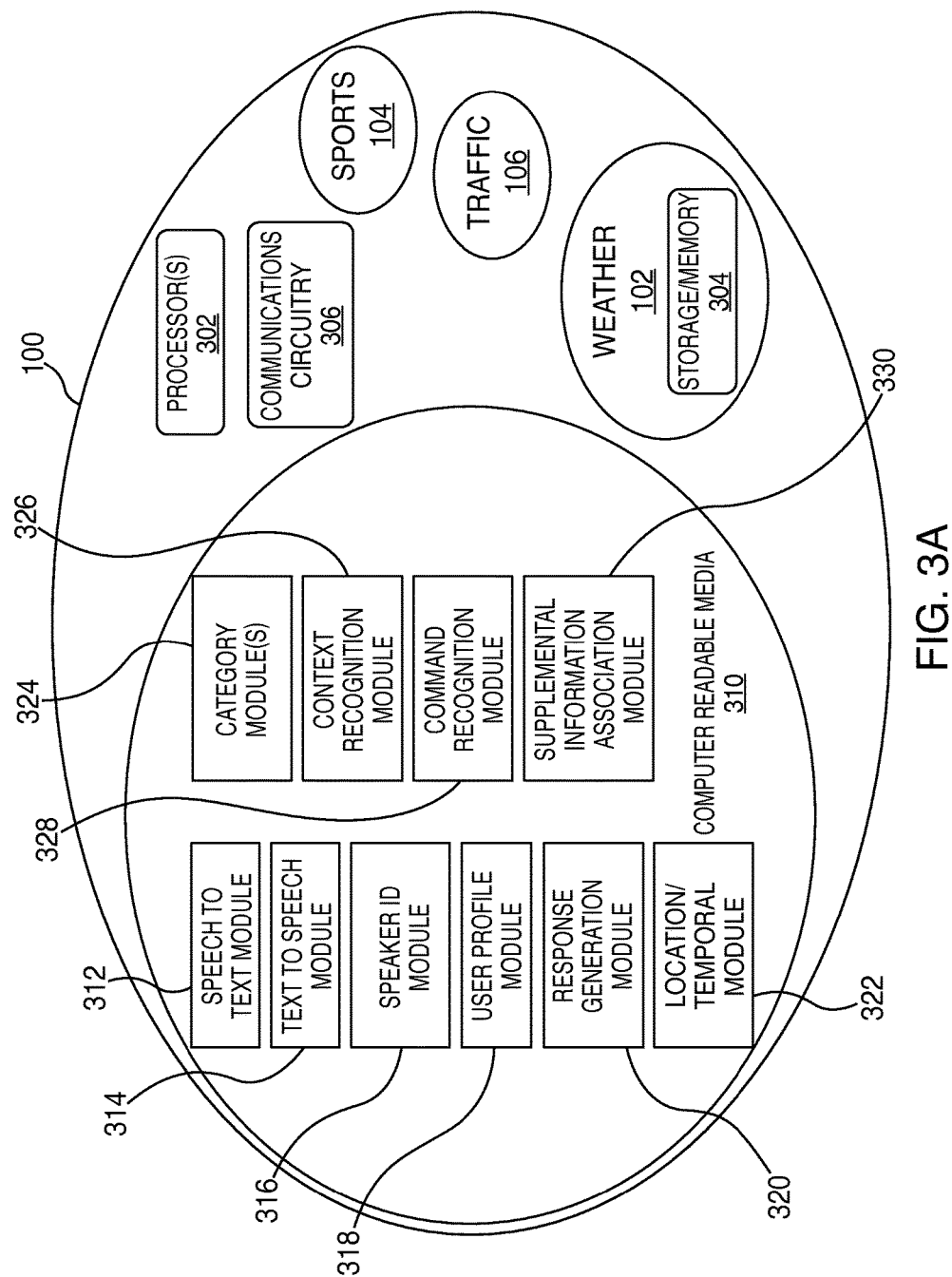
FIGS. 3A and 3B are illustrative diagrams of various portions of cloud-based information system 100 of FIG. 1 in accordance with various embodiments.
Figure 3B:
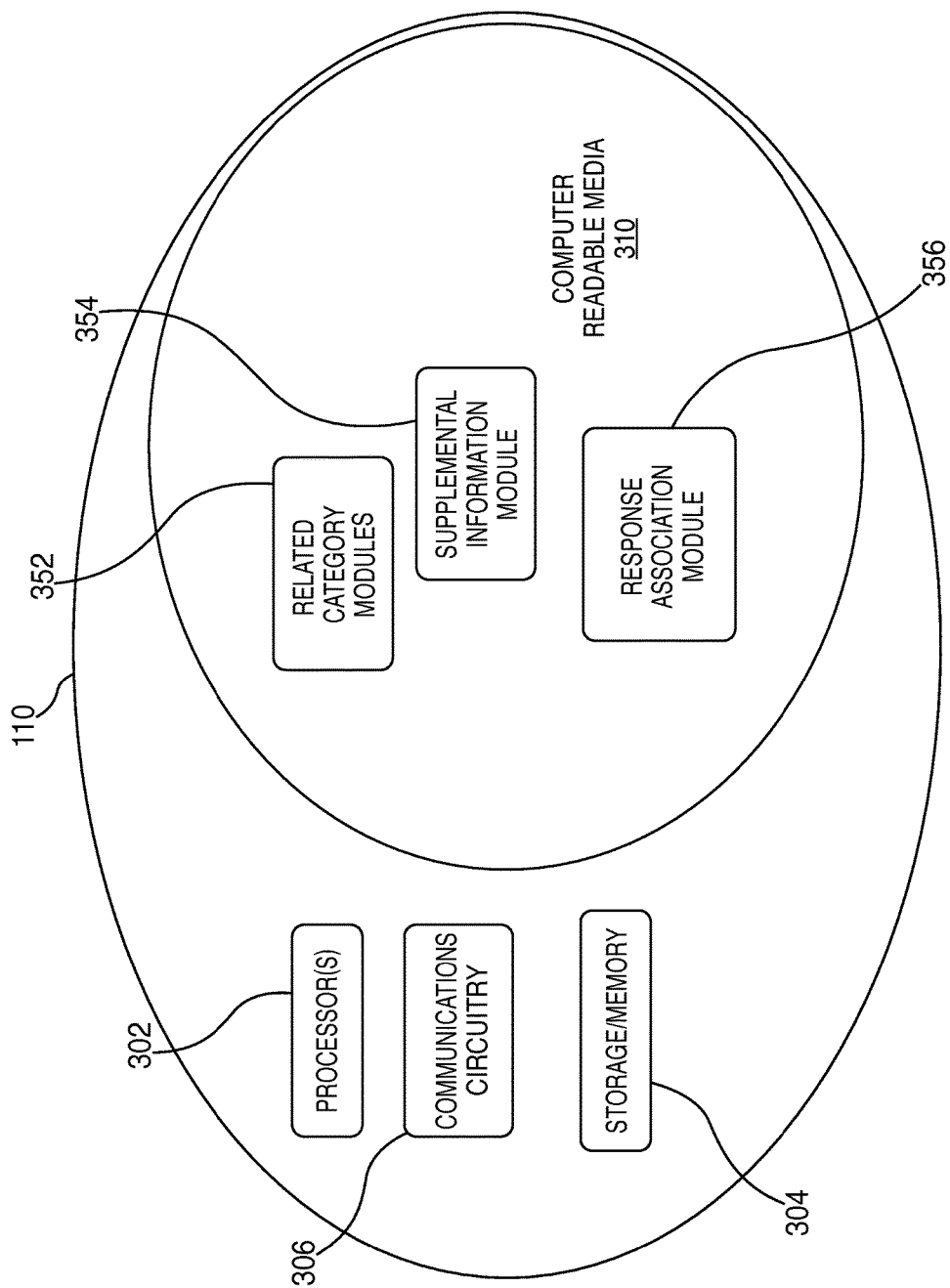

FIGS. 3A and 3B are illustrative diagrams of various portions of cloud-based information system 100 of FIG. 1 in accordance with various embodiments. As mentioned previously, in some embodiments, cloud-based information system 100 may be accessed by voice-controlled electronic device 10, where voice-controlled electronic device 10 may send an initial file including data representing audio of a command spoken by individual 2 to voice-controlled electronic device 10, and cloud-based information system 100 may, in response, send a return file to voice-controlled electronic device 10 including audio data representing an audio message including a response to the command and a supplemental information.

In some embodiments, each category server 102, 104, and 106 may be a database that stores specific category related information. Category servers 102, 104, and 106 may each include storage/memory 304 for storing information regarding that category server's subject matter. For example, category server 102 may be the "weather" category server, and therefore may include store/memory 304 that stores various information related to, or about, weather (e.g., forecasts, temperatures, weather related warnings, etc.). Each category server 102, 104, 106 may also be in communication with one or more processors 302 of cloud-based information system 100. For example, when audio data including a command is received by communications circuitry 306 of cloud-based information system 100, the category server that the command relates to may be determined, and processor(s) 302 may communicate with one of servers 102, 104, and 106 to retrieve a response to for the command. The audio data representing a message may also be sent back to voice-controlled electronic device 10 using communication circuitry 304. Processor(s) 302, storage/memory 304, and communications circuitry 306 may, in some embodiments, be substantially similar to processor(s) 202, storage/memory 304, and communications circuitry 206 of FIG. 2, respectively, and the previous descriptions may apply. Furthermore, although only one instance of storage/memory 304 is shown within server 102, this is merely exemplary, and each of category servers 104 and 106, or any other category server located on cloud-based information system 100 may also include their own category specific storage/memory 304.

Cloud-based information system 100 may, in some embodiments, include computer readable storage media 310 ("CRSM"), which may include one or more volatile and/or non-volatile memory storage mediums. For example, CRSM 310 may include flash memory, random access memory ("RAM"), and/or read-only memory ("ROM"), or any other type of memory, or any combination thereof. Furthermore, as used herein, CRSM 310 may also be referred to as memory, storage, and/or media, and persons of ordinary skill in the art will recognize that each term represents a common function of storing information thereon.

CRSM 310 may include various modules that store software, hardware, logic, instructions, and/or commands for cloud-based information system 100 to perform. For example, CRSM 310 may include a speech-to-text ("STT") module 312, a text-to-speech ("TTS") module 314, speaker identification ("ID") module 316, a user profile module 318, a response generation module 320, a location/temporal module 322, one or more category modules 324, a context recognition module 326, a request recognition module 328, and a supplemental information association module 330. However, CRSM 310 may include more or fewer modules, and/or multiple instances of certain modules, and the aforementioned is merely illustrative.

Speech-to-text module 312 and text-to-speech module 314 may, in some embodiments, be combined into a single module capable of performing both STT and TTS processing. When individual 2 says command 4, which is received by microphone(s) 208 of voice-controlled device 10, audio data of the spoken command is captured, along with one or more pieces of associated data. This audio data may be transmitted in initial file 6 from voice-controlled electronic device 10 to cloud-based information system 100 using communications circuitry 206 and 306. After cloud-based information system 100 has received initial file 6 including the audio data representing the spoken command, processor(s) 302 may send the audio data to speech-to-text module 312 to convert the audio data to text data. While techniques for transcribing speech into text are well known in the art and need not be described in further detail herein, any suitable computer implemented speech to text technique may be used to convert the received audio signal into text, such as SOFTSOUND® speech processing technologies available from the Autonomy Corporation, which is headquartered in Cambridge, England, United Kingdom. In some embodiments, one or more filters may be applied to the received audio data to reduce or minimize extraneous noise, however this is not required.

In some embodiments, upon receiving the audio data from voice-controlled electronic device 10, speaker ID module 316 may analyze the pitch, tone, speech pattern, inflection, or any other suitable criteria, to determine a specific individual that said command 4. For example, user profile module 318 may store one or more user profiles corresponding to users corresponding to a registered account on cloud-based information system 100. For example, a parent may have a registered account on cloud-based information system 100, and each of the parent's children may have their own user profile registered under the parent's registered account. Information, settings, and/or preferences, for example, for each user profile may be stored within user profile module 318. In response to receiving the audio data of command 4, speaker ID module 316 may attempt to match the voice of the individual who spoke command 4 with a voice signal for a specific user profile stored within user profile module 318. If speaker ID module 316 is able to match the voice that spoke the command with a specific user profile corresponding to the individual's registered account within user profile module 318, user profile module 318 may indicate to speaker ID module 316 which user profile that the voice matches. If, however, speaker ID module 316 is not able to match the voice that spoke the command with any user profiles stored within user profile module 318, user profile module 318 may cause a message to be transmitted back to voice-controlled electronic device 10 indicating that the voice used to make command 4 is not recognized as having an account on cloud-based information system 100, and may also provide instructions to set up a user profile. However, persons of ordinary skill in the art will recognize that this is merely exemplary, and in some embodiments no speaker ID module 316 may be used by cloud-based information system 100.

After the audio data representing the audio message including command 4 has been converted into text by speech-to-text module 312, the text may be analyzed by context recognition module 326 to determine a type of context, or subject matter, that the command corresponds to. Context recognition module 326 may analyze each word or phrase within the text, and compare that word or phrase with various keywords stored within a contextual database of context recognition module 326. For example, the text from command 4 may be recognized as including the word "weather." In this particular scenario, the word "weather" may be compared with various keywords stored within the contextual database of context recognition module 326 to determine a match. Each keyword may correspond to a category server having its own database located on one or more servers (e.g., first party category servers 102, 104, 106) on cloud-based information system 100. In response to determining that text from the audio data matches one of the keywords within the contextual database of context recognition module 326, category module 324 may locate a category server corresponding to that keyword. Using the previous example, context recognition module 326 may determine that the word "weather" matches a keyword (e.g., keyword "weather") within the contextual database, and may inform category module 324 of a positive match. Category module 324 may then determine which category server located on cloud-based information system 100 corresponds to that keyword. For example, category module 324 may determine that category server, whose category may be "weather," corresponds to the matching keyword.

In addition to determining the context of the text using context recognition module 326, CRSM 310 may also determine a type of request or action that command 4 is intending to make using command recognition module 328. In some embodiments, command recognition module 328 may analyze the text form the audio data representing the spoken command to determine various words or phrases, which may signify a type of command that individual 2 said. Using the previous example, command recognition module 328 may receive an indication of the keyword from context recognition module 326, and may determine common command made for such a keyword. Based on the common commands for that keyword, command recognition module 326 may analyze the text of audio data representing the spoken command 4 to determine if any other words or phrases from the text match a common command for that keyword. If there is a related command, that command, along with the determined keyword, may be sent to an appropriate category server using category module 324. If not, then request recognition module 328 may send a most commonly used request for the determined keyword to the appropriate category server via category module 324.

After the appropriate category server has been selected (e.g., server 102), response generation module 320 may retrieve a response from the selected category server based on the spoken command. For example, if the spoken command is "What is the weather like today?", response generation module 320 may receive the weather information for the date the command was made (e.g., "today") from storage/memory 304 of weather category server 102, and may generate a response based on the received weather information. Continuing the example, the weather information may indicate that it is currently raining in the location that the command was made (e.g., Seattle, Wash.), and this information may be formulated into a response by response generation module 320 in textual format, and then sent to text-to-speech module 314 to be converted into an audio file. Text-to-speech module 314 may include any suitable software, hardware, logic, instructions, and/or commands that convert text into audio data representing an audio message including the response. Techniques for converting text into audio, or speech, are well known in the art and need not be discussed in further detail herein. However, in some embodiments, similar techniques used to convert audio to text, as mentioned above, may be used to convert text into audio.

In some embodiments, location/temporal module 322 may be used to determine a current location of voice-controlled electronic device 10, as well as a current time/date that a command was spoken to voice-controlled electronic device. The current location and/or time/date may be sent to the selected category server to refine the information that will be retrieved. For example, command 4 may have asked "What is the weather like today?", however weather server 102 may not know which location's weather to provide in response. Location/temporal module 322 may analyze a location of voice-controlled electronic device 10 using location information extracted from the audio data representing the spoken command 4. Location/temporal module 322 may also analyze initial file 6 to determine a time and/or date that initial file 6 was sent from voice-controlled electronic device 10 to cloud-based information system 100, as well as, or in addition to, a time and/or date that initial file 6 was received by cloud-based information system 100. For example, the associated data may include an indication of an IP address or GPS location of voice-controlled electronic device 10 and a time that initial file 6 was received by cloud-based information system 100. This location information may be used, in conjunction with the determined keyword, by request recognition module 328 to retrieve weather information for the location of voice-controlled electronic device 10. Persons of ordinary skill in the art will recognize that not all commands may require a location, and therefore location/temporal module 322 may not be needed in certain scenarios. Furthermore, persons of ordinary skill in the art will recognize that the time that initial file 6 is sent from voice-controlled electronic device 10 and a time that initial file 6 is received by cloud-based information system 100 may be substantially similar.

In some embodiments, CRSM 310 may include supplemental information association module 330. Supplemental information association module 330 may serve a multitude of functions. In one embodiment, module 330 may analyze the context recognized by context recognition module 326, and may determine any related or associated context with the recognized context. For example, if an individual asks for the weather for a particular location, that individual may also be interested in the traffic for, or events occurring in, that location. In another embodiment, module 330 may determine other categories (e.g., servers 102, 104, and 106) that may be related to the category selected by category module 324 to be related with the context of command 4. For example, weather category server 102 and traffic category server 104 may be associated with one another, such that when weather server 102 is used to retrieve weather information for a command, supplemental information association module 330 may retrieve relevant traffic information from traffic category server 106 to be used in a response to command 4. In some embodiments, supplemental information association module 330 may determine that a selected category server, such as servers 102, 104, and 106, may be associated with one or more third party category servers, such as third party category servers 110. Module 330 may then attempt to retrieve one or more pieces of supplemental information from a specific third party category server 110 based on the selected category server and third party category server's association to one another. Still further, supplemental information module 330 may determine one or more third party category servers 110 to retrieve one or more pieces of supplemental information from based on the context recognized by context recognition module 326.

Figure 7:
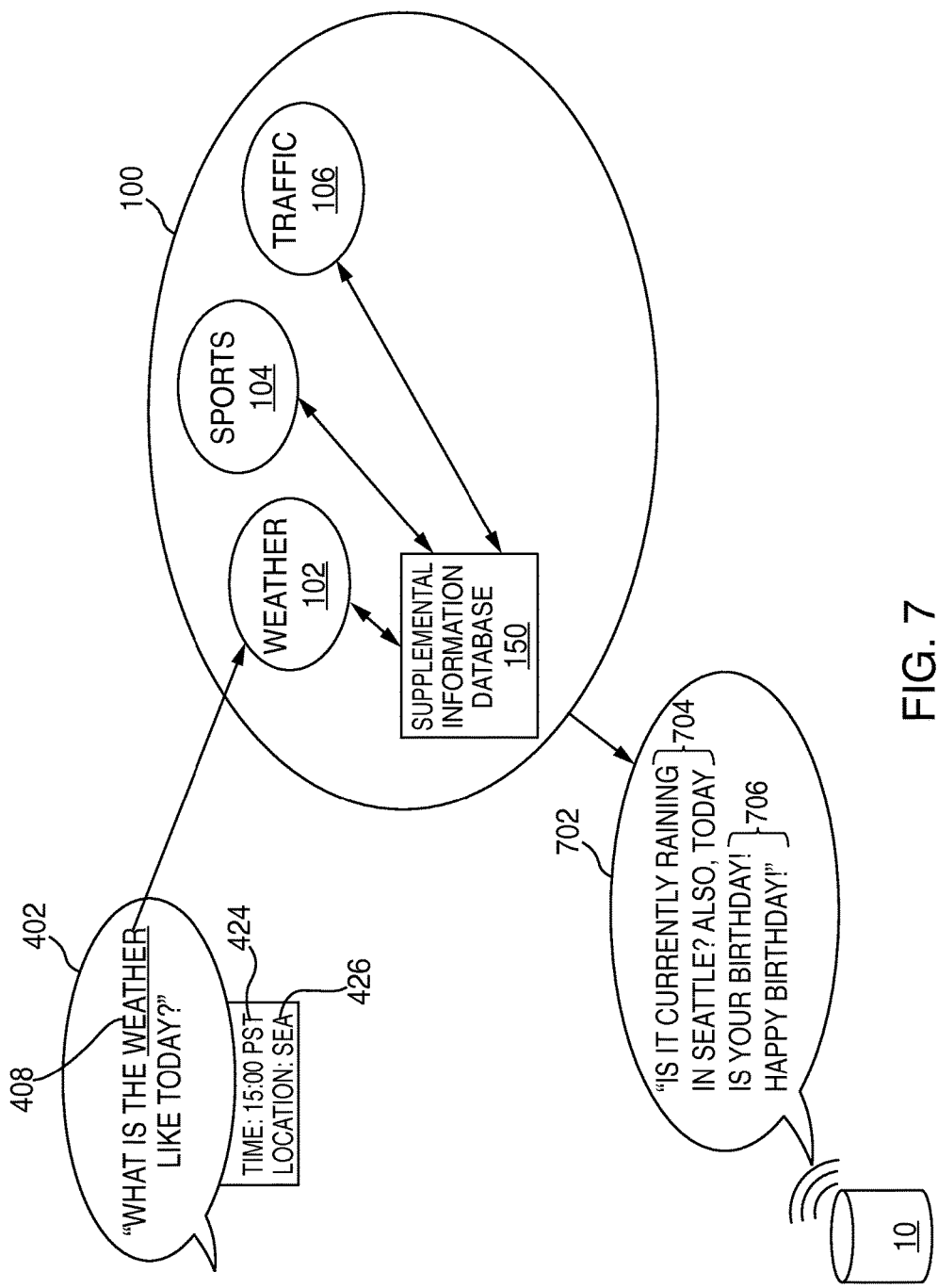
FIG. 7 is an illustrative diagram of an exemplary operation within the architecture of FIG. 1 in accordance with various embodiments.

In some embodiments, supplemental information association module 330 may include a supplemental information database therein (e.g., supplemental information database 150 of FIG. 7). The supplemental information database may include any suitable memory and/or storage circuitry operable to store various supplemental information related to any user profile stored within user profile 318, or corresponding to an individual's registered account on cloud-based information system 100. In some embodiments, the supplemental information database may be continually populated with supplemental information retrieved from various first or third party category servers. For example, the supplemental information database may retrieve supplemental information related to an individual's registered account from weather category server 102. In this scenario, supplemental information that is retrieved may correspond to useful weather information related to individual 2, and therefore may be readily available for the individual when a command is made. In this way, an individual may be provided with the useful supplemental information in addition to a response to a command.

FIG. 3B is an exploded view of an exemplary third party category server 110, which is in communication with cloud-based information system 100 of FIG. 1, in accordance with various embodiments. For example, third party category server 110 may be correspond to a third party category related to one or more category servers (e.g., category servers 102, 104, 106), or other third party category servers (e.g., third party category servers 112, 114, 116). Each third party category server 110 may be substantially similar in design and function to category servers 102, 104, and 106, for example, however each third party category server 110 may correspond to a specific category of subject matter. In some embodiments, third party category servers 110 may be located within cloud-based information system 100. For example, third party category servers 110 may exist in a similar manner as category servers 102, 104, and 106, however they may be related to other third party category servers instead.

In some embodiments, third party category servers 110 may include one or more processor(s) 302, storage/memory 304, and communications circuitry 306. Third party category server 110 may also include computer readable storage media 310 ("CRSM"), which may store one or more related category modules 352, supplemental information module 354, and response association module 356. Related category module(s) 352 may be used to associate one or more third party category servers 110 with a selected category server based on the subject matter of that category server. For example, if the selected category server is weather category server 102, supplemental information module 330 may communicate with related category module 352 for each third party server 110 to determine which third party category server 110 is associated with the subject matter of weather server 102. Related category module 352 may determine the subject matter of the selected category server from supplemental information module 330, and compare the selected category server's subject matter to the subject matter of each third party category server 110 to determine which third party category server (e.g., third party category servers 112, 114, 116) is most related to the selected category. In some embodiments, one or more rules for associating a selected first party category server with a third party category server may be used, as described in greater detail below (e.g., FIG. 6).

After related category module 352 has determined a particular third party category server 110 to be selected, processor(s) 302 may instruct supplemental information module 354 of CRSM 310 to retrieve one or more pieces of supplemental information from storage/memory 304 for that third party category server. The supplemental information may be any useful information that may be stored by a third party server and provided to cloud-based information system 100 to generate a response to an individual's command 4. For example, if an individual wants to know where the closest gas station is, the selected category server may retrieve the closest gas station, while the selected third party category server may determine if the closest gas station is less expensive then the next closest gas station, and provide that information to the individual as well.

Response association module 356 may serve a variety of functions including cross checking the supplemental information retrieved by supplemental information module 354 with supplemental information association module 330 to ensure that appropriate supplemental information is being provided. Response association module 356 may additionally, or alternatively, determine if there are any additional category servers that may be capable of providing more relevant, or additional, pieces of supplemental information. For example, weather category server 102 may be the selected category server to provide information regarding the weather, however response association module 356 may determine that, in addition to a birthday notification, traffic server 106 may also be able to provide useful traffic information with the weather and birthday information. However, persons of ordinary skill in the art will recognize that the aforementioned is merely exemplary.

Figure 4:
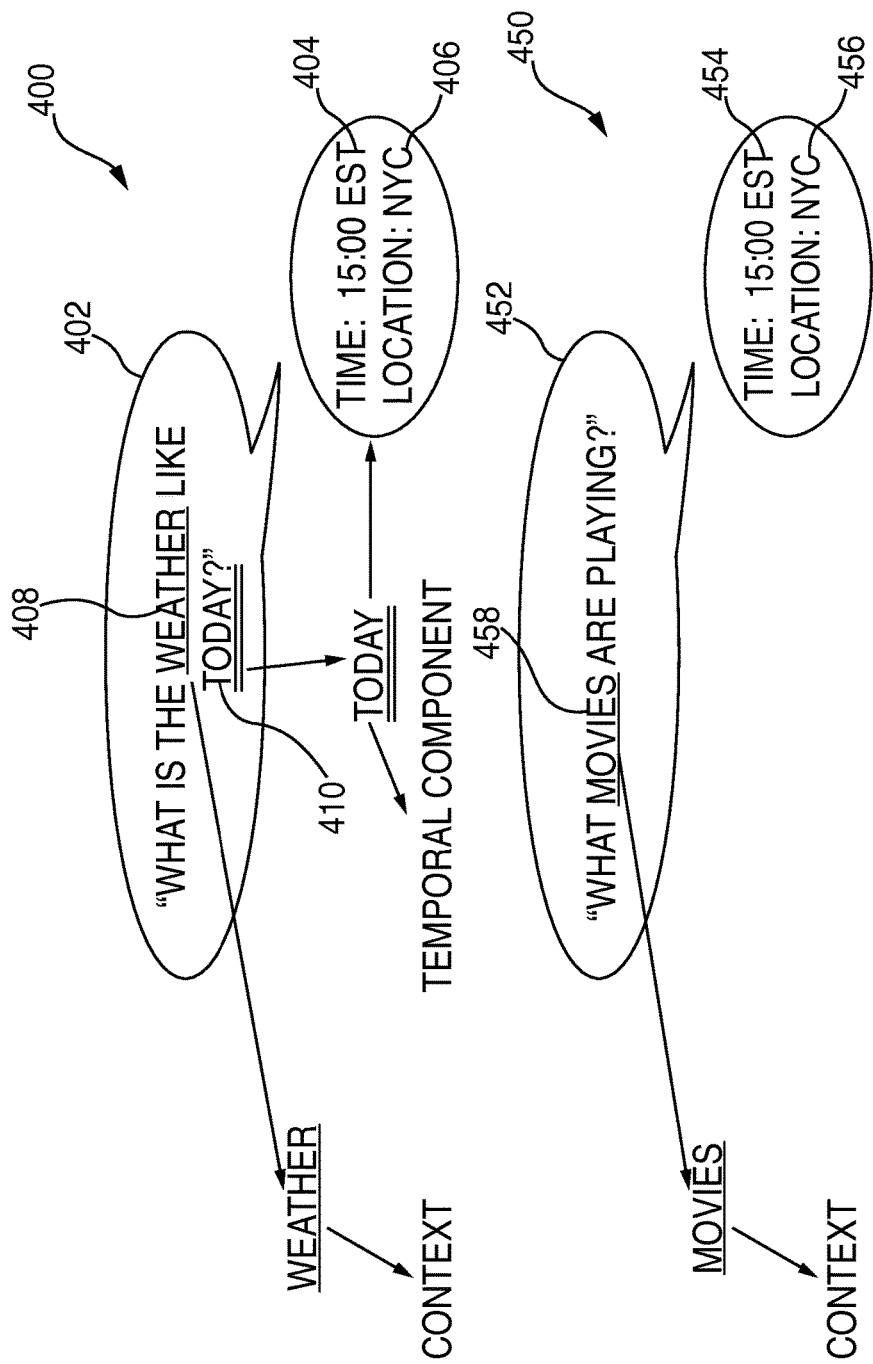
FIG. 4 is an illustrative diagram of an exemplary operation within the architecture of FIG. 1 in accordance with various embodiments.

FIG. 4 is an illustrative diagram of an exemplary operation within the architecture of FIG. 1 in accordance with various embodiments. Exemplary scenarios 400 and 450 of FIG. 4 describe illustrative breakdowns of spoken commands 402 and 452 asked by an individual (e.g., individual 2 of FIG. 1) that are transmitted from voice-controlled electronic device 10 to cloud-based information system 100, and relevant data extracted from audio data representing the spoken commands that is received by cloud-based information system 100. Command 402, in one exemplary embodiment, corresponds to a command—"What is the weather like today?"—said by an individual (e.g., individual 2). In this particular scenario, the word "weather" may be recognized as context 408 of command 402, and may be compared with one or more category servers (e.g., servers 102, 104, 106) on cloud-based information system 100 to determine which category server's subject matter context 408 corresponds to. For example, context recognition module 326 of CRSM 310 may determine that context 408 of command 402 is "weather," and therefore may use category module 324 to select a corresponding category server whose subject matter corresponds to context 408 (e.g., weather category server 102).

In addition to recognizing context 408, temporal component 410 may be recognized within command 4 by location/temporal module 322. For example, the word "today" may be recognized as a temporal indication for the time/date of command 402. In some embodiments, in addition to transmitting audio data representing spoken command 402 within an initial file (e.g., initial file 6) from voice-controlled electronic device 10 to cloud-based information system 100, one or more pieces of associated data may be included. For example, temporal data and location data may be included within initial file 6 sent to cloud-based information system 100 for command 402. In response to recognizing temporal component 410, location/temporal module 322 may determine from the associated data, such as time and location 404 and 406, respectively, a time associated with command 402. Therefore, recognition of the word "today" within command 402 may cause location/temporal module 322 to associate the time 15:00 EST with command 402.

As another illustrative example, command 452 of exemplary scenario 450 may correspond to command said by an individual, such as individual 2 of FIG. 1, "What movies are playing right now?" In this particular scenario, the word "movies" may be recognized as context 458, and may be compared with one or more category servers (e.g., category servers 102, 104, 106) on cloud-based information system 100 to determine which category server's subject matter is related to context 458. For example, context recognition module 326 may determine that context 458 is "movies," and therefore may use first party application module to select a corresponding category server whose subject matter corresponds to context 458 (e.g., a movie category server).

Command 452 may include, when transmitted in initial file 6 to cloud-based information system 100, temporal data 454 and location data 456. In response to command 452 not including a specific time indication, location/temporal module 322 of CRSM 310 may default to use time 454 from the associated data included with the audio data representing spoken command 402. In some embodiments, location data 456 may also be used to retrieve an accurate response to command 452. For example, location data 456 may be used to determine, based on context 458, which movies are playing proximate to the location of individual 2. Furthermore, in some embodiments, temporal data 404, 454 and/or location data 406, 456 may be used to retrieve supplemental information that may be used for a response to commands 402 and/or 406.

Figure 5:
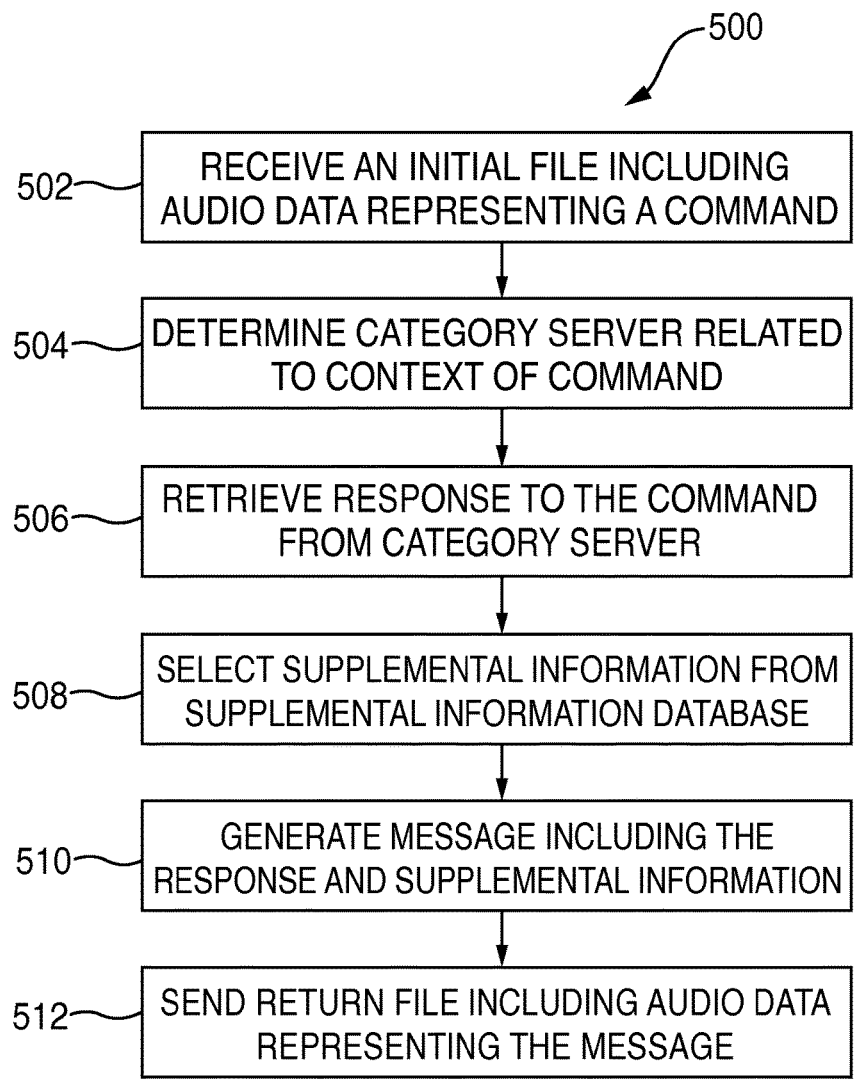
FIG. 5 is an illustrative flowchart of a process for providing a response to a command and a supplemental information in accordance with various embodiments.

FIG. 5 is an illustrative flowchart of a process for providing a response to a command and supplemental information in accordance with various embodiments. Process 500 may begin at step 502. At step 502, an initial file including audio data representing a spoken command may be received by cloud-based information system 100. For example, cloud-based information system 100 may receive initial file 6, which may be sent from voice-controlled electronic device 10. The audio data from initial file 6 may include one or more factors, such as a time that command 4 was said and/or a location of where voice-controlled electronic device 10 is when command 4 was said. After receipt of initial file 6, cloud-based information system 100 may convert the audio data representing spoken command 4 to text using speech to text module 312, and the command that was spoken and the one or more factors (e.g., time, location) may be extracted from the audio data. Techniques for transcribing speech into text are well known in the art and need not be described in further detail herein.

Process 500 may then proceed to step 504, where a category server to be used for a response to command 4 may be determined. In some embodiments, a context word or phrase, such as context 408 or 458, may be recognized within the command using context recognition module 326. Using the recognized context, category module(s) 324 may compare the recognized context with a subject matter of each category server on cloud-based information system. For example, context 408 of command 402 may be the word "weather." Category module 324 may compare context word 408 to the subject matter of each category server, such as category servers 102, 104, and 106. In response to determining that context 408 and one (or more) of the category servers, such as category server 102 (e.g., weather server 102), are related to one another, category module 324 may select that category server (or servers).

At step 506, a response to the spoken command may be retrieved from the selected category server. In some embodiments, command recognition module 328 may determine a type of command spoken by the individual. For example, if the related words or phrases from the converted text of the command match a common request for the context's keyword, the command may be sent to an appropriate category server using category module 324, whereas if there is not any related words or phrases, command recognition module 328 may send a most commonly used command for a particular context's keyword to an appropriate category server. After the command has been determined and the appropriate category server has been selected, response generation module 320 may retrieve a response information from the selected category server's storage/memory 304. For example, response generation module 320 may retrieve and generate a response including the weather information for the day "today" from storage/memory 304 of weather server 102.

At step 508, supplemental information may be selected from a supplemental information database. The supplemental information database may include supplemental information that is related to an individual's registered account on cloud-based information system 100. The individual's account on cloud-based information system 100 may, for instance, be populated with supplemental information related to one or more account settings, preferences, and/or user profiles within the registered account. The supplemental information may, therefore, be related to the individual, or individuals having a user profile under the umbrella of the registered account (e.g., children having user profiles under a parent or guardian's master account). The supplemental information stored in the supplemental information database may be continually modified and updated based on a validity of the supplemental information, the importance or urgency of the supplemental information, and/or the preferences associated with the registered account. In some embodiments, the supplemental information is selected based on the previously extracted one or more factors. For example, the supplemental information selected may be selected based on a time that the command was received by cloud-based information system 100.

In some embodiments, supplemental information module 330 may analyze the context within the command to determine a related third party category server (or first party category) to retrieve supplemental information from. For example, weather category server 102, may be related to traffic category server 106. If an individual, for instance, seeks to know the weather, they may also be provided with traffic information for the location that they are obtaining weather information for. As another example, if a user asks, "What was the score of the game last night?", sports category server 104, which may correspond to the sports category server, may be related to a ticketing third party category server, and information related to tickets for a sporting event (or other events) may be retrieved in addition to the score of the game from the previous evening.

Relating a categories to one other may occur based on one or more rules for relating categories. In some embodiments, a past history of categories that have been used to provide supplemental information for a specific category server, or retrieve responses to commands, may be used as a rule. For example, for each instance when weather category server 102 is used, local events category server 116 may have also been used. Therefore, if context recognition module 326 recognizes that a command relates to the weather, supplemental information association module 330 may look to local events category server 116 to provide supplemental information.

In some embodiments, certain categories may be analyzed to determine whether or not they may be capable of providing useful supplemental information with a response. For example, birthday category server 112 may be analyzed in conjunction with each command. When birthday category server 112 determines that the date of the command matches pre-stored birthday information stored in user profile module 318 for the individual that said or made the command, or having a user profile within cloud-based information system 100, it may cause a birthday message to be provided to response generation module 320, which will be provided with the response to the command. As yet another embodiment, categories that are related to a selected category may be ranked based on how related they are to the selected category. If a category is related to the subject matter of a selected category server then that category is ranked against other related categories to determine which category is most related, or most associated, with the subject matter of the selected category. A top related category, or top related categories, may be then chosen to provide supplemental information.

At step 510, an audio message is generated that includes the response to the command as well as the selected supplemental information. Using the example, "What is the weather like today?", weather information may be retrieved from weather server 102, and if the time/date corresponding to the time/date extracted from the received audio data matches a date stored in user profile module 318 for the user's birthday, then supplemental information may be selected from the supplemental information database. As an illustrative example, weather category server 102 may retrieve information about the weather, such as "It is currently raining in Seattle, Wash.," and also obtain supplemental information for the user's birthday, such as "Today is your birthday! Happy Birthday!", which may be selected from the supplemental information database. In some embodiments, the supplemental information that is selected may be appended to the response to the command that was retrieved. The message that is then created may include the supplemental information appended to the response. Furthermore, audio data representing the message including the response and the appended supplemental information may be created by cloud-based information system 100.

At step 512, the generated message may be sent in a return file, such as return file 8, to voice-controlled electronic device 10. In some embodiments, audio data representing the message generated. For example, the message may be converted from text to an audio message using text to speech module 314. This may create audio data including an audio message that is capable of being outputted on speaker(s) 210 of voice-controlled electronic device 10. Communications circuitry 306 of cloud-based information system may then transmit return file 8 including the audio data representing the audio message to voice-controlled electronic device 10. In some embodiments, return file 8 may include instructions that, when received by voice-controlled electronic device 10, cause processor(s) 202 to output the audio message on voice-controlled electronic device 10 using speaker(s) 210.

Figure 6:
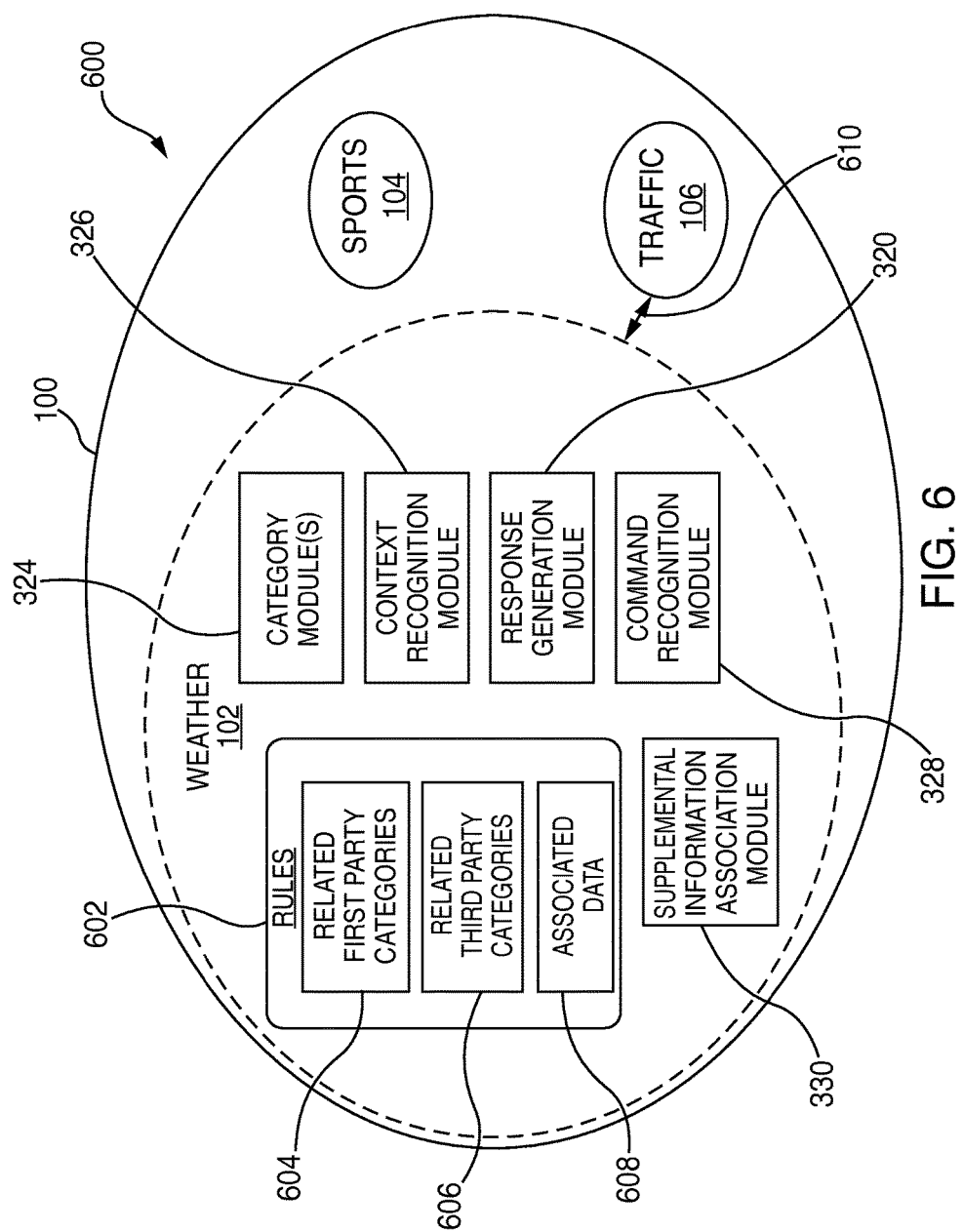
FIG. 6 is an illustrative diagram of a portion of the architecture of cloud-based information system 100 of FIG. 1 in accordance with various embodiments.

FIG. 6 is an illustrative diagram of a portion of the architecture of cloud-based information system 100 of FIG. 1 in accordance with various embodiments. Command 402 of FIG. 4, as mentioned previously, includes context 408 (e.g., "weather"), which may be recognized by context recognition module 326 of cloud-based information system 100. Based on the determined context, category module 324 may determine and select a corresponding category server to retrieve a response to the command. For example, for the context "weather," the selected category server may be weather category server 102.

Portion 600 of cloud-based information system 100 includes weather category server 102 as a selected category for retrieving information related to context 408 of command 402. The information retrieved for a response to a command, which may be referred to in some embodiments as primary information, which is based on context 408 of command 402, may be retrieved from storage/memory 304 of weather category server 102. After retrieving the primary information for the response to the request, supplemental information association module 330 may apply one or more rules 602, which may be stored within weather category server 102, for retrieving supplemental information for the response. In some embodiments, rules 602 may include related categories 604, related third party 606, and associated data 608. Persons of ordinary skill in the art will recognizing that more or fewer rules may be included within rules 602, and the aforementioned are merely exemplary.

Rule 604 may provide various conditions that link a selected category server (e.g., weather category server 102) to another category server (e.g., sports category server 104, traffic category server 106, etc.). In some embodiments, context 408, recognized by context recognition module 326, may be compared with a subject matter corresponding to the other category servers within cloud-based information system 100. Each of the other categories may include a list of keywords that, if a certain context includes, may be defined as being related. For example, "weather" may be compared with keywords of sports category sever 104 and of traffic category server 106. Sports category server 104 may include a list of keywords that does not include the word "weather," whereas traffic category server 106 may include a list of keywords that does include the word "weather." Using this association scheme, rule 604 may signify that for context word 408 (e.g., "weather"), a related category may be traffic category server 106, which may be used to retrieve supplemental information to command 402. In this particular scenario, as illustrated within FIG. 6, weather category server 102 may be linked to traffic category server 106 via link 610.

In some embodiments, certain categories may have other categories that are defined by rule 604 to be related to one another. For example, rule 604 for weather server 102 may indicate that if context 408 includes the word "weather," then in addition to using weather category server 102 to retrieve a response to the request, traffic category server 106 should also be used to determine if there is any supplemental information that should be retrieved based on command 402 and, if so, provide that supplemental information to response generation module 320 for generating a response to command 402 that includes the supplemental information from traffic category server 106. In yet some other embodiments, rule 604 may retrieve a history of categories from user profile module 318 that have been used prior to, or after, use of a selected category. For example, on multiple occasions after a command has been made that uses weather server 102, an individual makes a subsequent command that uses traffic server 106. In this particular scenario, user profile module 318 may store each command made and each category server used, and determine common categories used after a specific category server has been selected. In still yet another embodiment, cloud-based information system 100 may analyze a variety of user inquiry patterns that indicate common categories used with other categories. Rule 604 may, therefore, use the user inquiry patterns of a sample of users who access cloud-based information system 100 to determine which categories are most likely to be used with a selected category, and therefore indicate to supplemental information module 330 to retrieve supplemental information from the related category.

Rule 606 may include various conditions that link one or more third party category servers (e.g., servers 112, 114, 116) with a selected category server (e.g., server 102, 104, 106). Some features of rules 606 may be substantially similar to those of rules 604. For example, each third party category server may include a list of keywords. If a certain context is included in one of the lists of keywords, that third party may be defined as being related to the category server that is selected based on the context. As another example, certain third party category servers may be defined by rule 604 as being related to a specific category server. Each time a category server is selected to retrieve information for forming a response to a command, a pre-selected third party category server may be used to retrieve supplemental information from, or provide supplement information to, the supplemental information database. As yet another example, third party category servers previously used in relation with a selected category server to obtain supplemental information may be stored within rules 606 such that if a category is selected, a specific third party server may also be used to retrieve supplemental information.

In some embodiments, however, one or more additional rules 606 for relating third party category servers and first party category servers together may be used. For example, one or more third party category servers may be analyzed in response to every command made. When each command is received and a category server is selected, a first or third party category server may be analyzed to determine if a conditional statement holds true. As an illustrative example, each time a command is made, supplemental information association module 330 may apply rules 606 to birthday third party server 112. Birthday third party server 112 may include a conditional statement that checks the date extracted from the audio data representing the command spoken, and determines whether or not the date that the command was made is equal to the individual's birthday. The individual's birthday may, for example, be stored in user profile module 318, so in some embodiments birthday server 112 may communicate with user profile module 318 to ascertain a specific date that is the individual's birthday, and the birthday message may be provided to the supplemental information database to be stored and called upon if the conditional is valid. For example, if the date of the command matches the individual's birthday, supplemental information may be selected from the supplemental information data provided by birthday category server 112.

In some embodiments, associated data rules 608 may be used to relate categories with other categories based on the received initial file 6 including the command. Associated data rules 608 may use some or all of the associated data received with the initial file, such as temporal data or location data (e.g., temporal data 404 and location data 406) to select a category or third party to retrieve supplemental information from. For example, associated data rules 608 may use temporal data 608 to determine whether any conflicts may exist with a response retrieved by a selected category. The supplemental information received may provide an indication for the response that a conflict may exist. As an illustrative example, if an inquiry was "What time is the next movie showing of 'The Movie'?", the movie category server may be used to retrieve a response including a time that "The Movie" is showing next, which may be based on the time determine from the temporal data. Associated data rule 608 may analyze user profile module 318 and obtain calendar information for the individual that made the inquiry to determine whether or not the individual has any conflicting events for that time. For instance, if the next time that "The Movie" is showing is 10:00 AM, and the individual has a meeting at 10:30 AM, the supplemental information obtained may indicate to the individual that they have a meeting that will conflict with the movie.

As another example, an individual may ask, "Where is the closest gas station?" In response, a category for gas station location may obtain the closest gas station to the individual based on the location data extracted from the received audio data representing the spoken command. Associated data rules 608 may, in response to retrieving from the closest gas station from the gas station location category, determine a cost of gas at each of the gas stations closest to the individual's location. Associated data rules 608 may therefore append the retrieved information of the closest gas station with supplemental information regarding which of the closest gas stations has the least expensive gas.

FIG. 7 is an illustrative diagram of an exemplary operation within the architecture of FIG. 1 in accordance with various embodiments. Exemplary scenario 700 of FIG. 7 is, in some embodiments, substantially similar to exemplary scenario 400 of FIG. 4, with the exception that a message 702 including a response 704 and supplemental information 706 are also included, as well as cloud-based information system 100.

In response to recognizing context 408 within command 402, weather category server 102 may retrieve a response. After the response has been retrieved, supplemental information database 150, which may be in communication with CRSM 310 and category servers 102, 104, 106, may have supplemental information selected from its database to be appended to the retrieved response. Supplemental information database 150 may store information related, for example, to an individual's registered account on cloud-based information system 100. One particular piece of supplemental information may be a birthday message, which may be used if the audio data representing the command has a date equal to a date stored on cloud-based information system 100 for the individual's birthday. If that condition is met, supplemental information, such as a birthday message, may be selected from supplemental information database 150 and provided to a response that will be sent to the individual.

In some embodiments, supplemental information database 150 may retrieve supplemental information from a related category server. The supplemental information may be added to the response retrieved from the category server determined to be associated with context 408 of the spoken command. As an illustrative example, in response to making command 402, response generation module 320 may retrieve response 704 from weather category server 102 and supplemental information 706 may be retrieved from supplemental information database 150. Message 702 may then be sent to voice-controlled electronic device 10 using communications circuitry 306 on cloud-based information system 100, and voice-controlled electronic device 10 may play message 702 through speaker(s) 210 so that individual 2 may listen to message 702 including response 704 and supplemental information 706.

Figure 8:
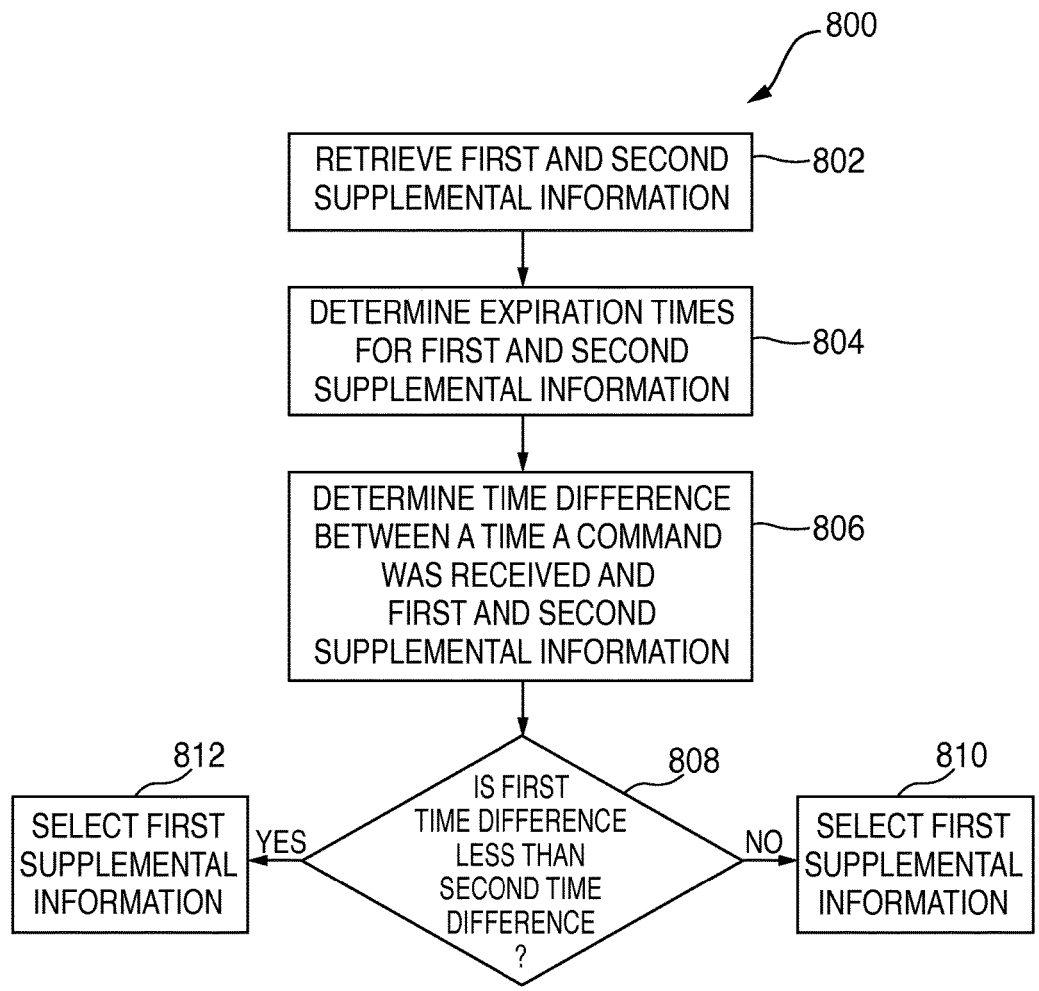
FIG. 8 is an illustrative flowchart of an exemplary process for selecting supplemental information to provide with a respond to a command in accordance with various embodiments.

FIG. 8 is an illustrative flowchart of an exemplary process for selecting supplemental information to provide with a response to a command in accordance with various embodiments. Process 800 may begin at step 802. At step 802, first and second supplemental information may be retrieved from a supplemental information database. In some embodiments, first and second supplemental information may be retrieved in response to a command being extracted from audio data representing the command, which was sent from voice-controlled electronic device 10, and was received by cloud-based information system 100. First and second supplemental information may be related to an individual's registered account on cloud-based information system 100, and may be stored in supplemental information database 150.

At step 804, an expiration time for each of the first and second supplemental information may be determined. For example, first supplemental information may have an expiration time for when it is no longer valid at time X, whereas second supplemental information may have an expiration time for when it is no longer valid at time Y. The expiration times X and Y may each be stored in supplemental information database 150 such that, when selected, the expiration time for each supplemental information is provided. The expiration time for supplemental information stored within supplemental information database 150 may represent a time when, after that time has passed, that supplemental information is no longer useful to be provided to an individual. For example, if the supplemental information is a birthday message, the supplemental information may no longer be useful once the individual's birthday has ended.

At step 806, a first time difference between the first expiration time of the first supplemental information and a second time difference between the second expiration time of the second supplemental information may be determined. The determination of the first and second time differences may be performed by supplemental information database 150, processors 302, and/or a category being used to retrieve a response to a command said, for example. The time differences may be stored in supplemental information database 150, such that they may be analyzed or compared in response to receipt of the command. In some embodiments, the expiration times for each supplemental information stored in the supplemental information database may be updated or refined. In this particular scenario, the time differences between supplemental information and a current time may be dynamic and continually updated.

At step 808, a determination is made as to whether the first time difference is less than the second time difference. If, at step 808, it is determined that the first time difference is less than the second time difference, then process 800 may proceed to step 812 where the first piece of supplemental information may be selected. If, however, at step 808, it is determined that the first time difference is not less than the second time difference, then process 800 may proceed to step 810, where the second piece of supplemental information is selected. After the appropriate supplemental information has been selected, that supplemental information may be appended to a response to a command that was said by an individual, and provided to the individual via an audio message that is created.

Although only first and second supplemental information are described above, persons of ordinary skill in the art will recognize that more than two instances of supplemental information may be used, and the aforementioned may be implemented accordingly with additional supplemental information. Furthermore, although it has been introduced that the first time difference and the second time difference are distinct, it is also possible for the first and second time differences to be equal, in which case one or more additional rules, such as selecting both the first and second supplemental information, or none of the supplemental information, may be applied.

Figure 9:
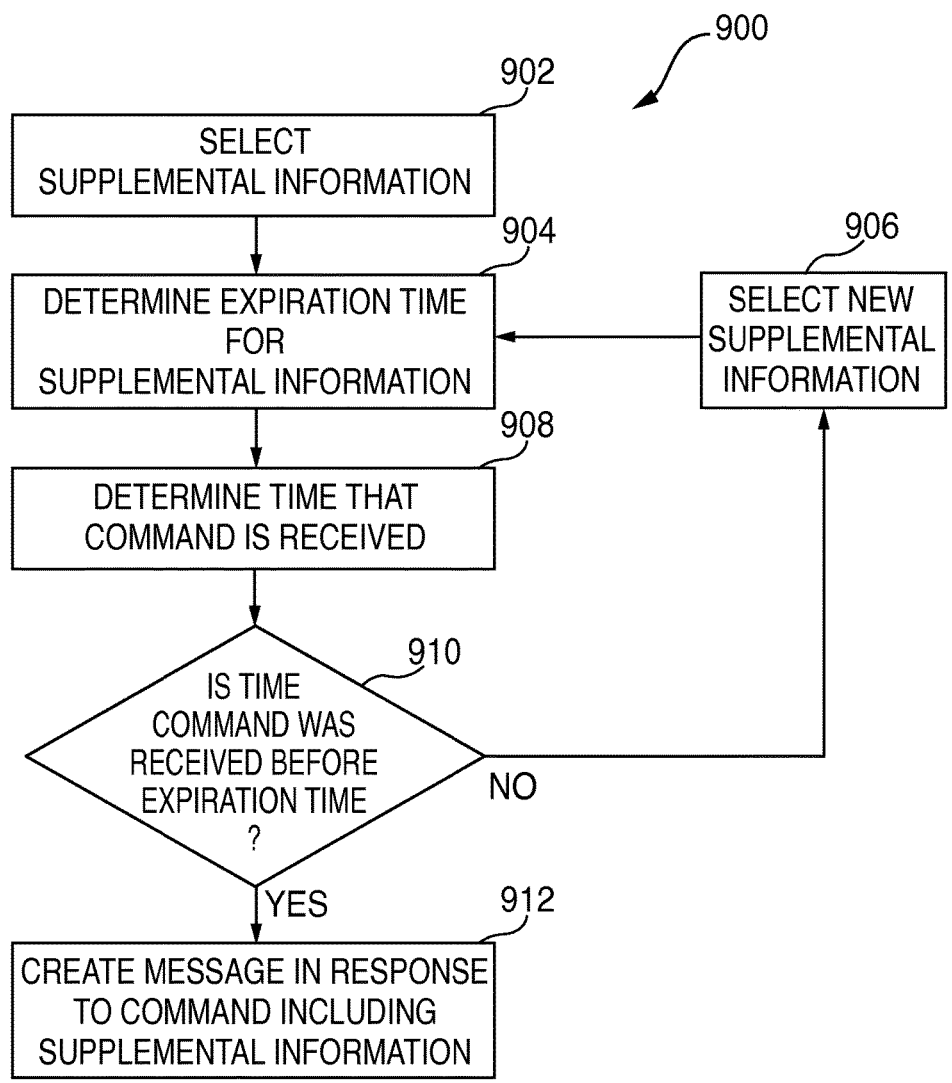
FIG. 9 is an illustrative flowchart of an exemplary process for providing supplemental information with a response to a command in accordance with various embodiments.

FIG. 9 is an illustrative flowchart of an exemplary process for providing supplemental information with a response to a command in accordance with various embodiments. Process 900 may begin at step 902, where supplemental information from the supplemental information database is selected. At step 904, an expiration time for the selected supplemental information is determined. At step 908, a time that a command is received by cloud-based information system 100 is determined. Steps 902, 904, and 906, in some embodiments, are substantially similar to steps 802, 804, and 806 of FIG. 8, with the exception that in the former, only a single expiration time for the selected supplemental information is determined.

At step 910, a query is run to determine whether a time that the command was received by cloud-based information system 100 is before an expiration time of the selected supplemental information. If, at step 910, it is determined that the time the command was received is before the expiration time of the selected supplemental information, a message may be created include a response to the command as well as the selected supplemental information. The message, for example, may then be converted into audio data representing the message, which is then transmitted from cloud-based information system 100 to voice-controlled electronic device 10. If, however, at step 910, it is determined that the time that the command was received is after the expiration time of the selected supplemental information, then process 900 may proceed to step 906 where new supplemental information is selected. For example, if a warning that was to be appended to a response to a command is no longer valid, new supplemental information from supplemental information database 150 may be selected at step 906. After step 906, process 900 may proceed again beginning at step 904 where an expiration time for the new supplemental information selected at step 906 is determined. Persons of ordinary skill in the art will recognize that, although at step 906 new supplemental information is selected in response to it being determined that the time the command was received is after the expiration time of the previously selected supplemental information at step 910, this is merely exemplary, and process 900 may instead not select new supplemental information at step 906. In this particular scenario, process 900 may proceed with creating a message only including the response to the command, and not including any supplemental information appended thereto.

Figure 10:
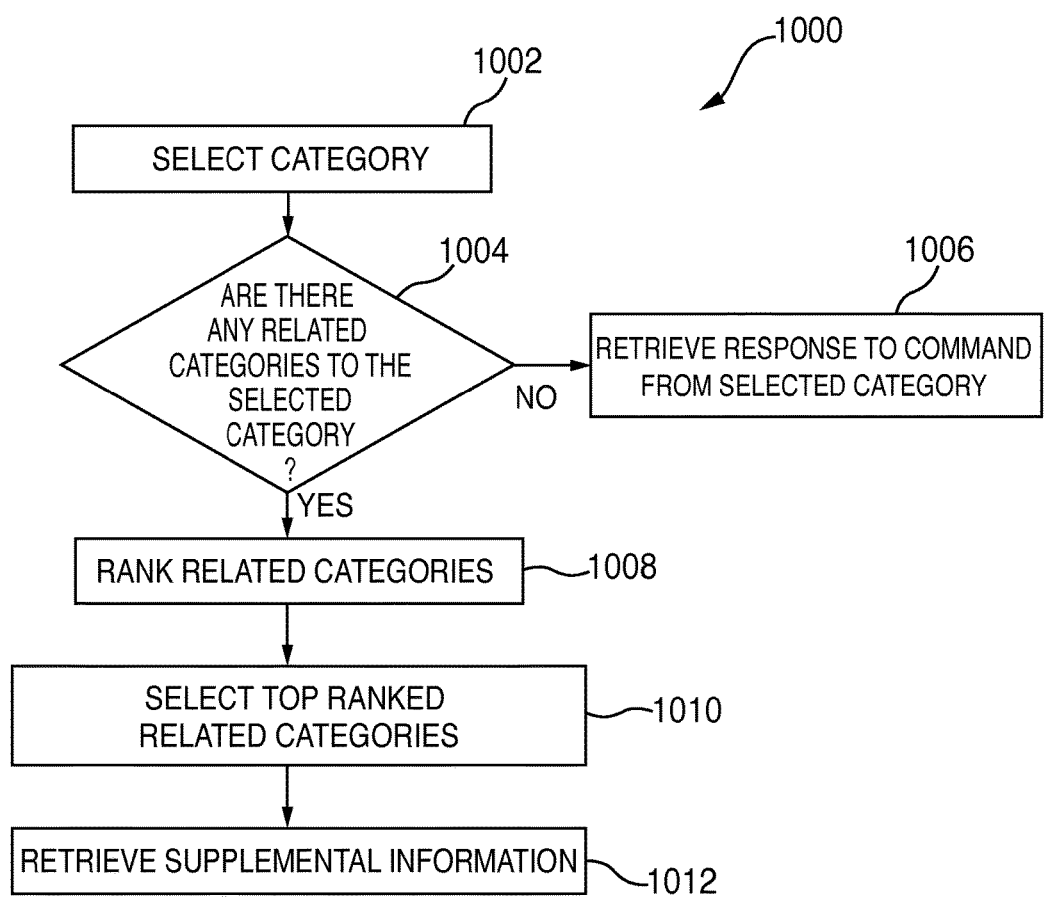
FIG. 10 is an illustrative flowchart of a process for selecting supplemental information in accordance with various embodiments.

FIG. 10 is an illustrative flowchart of a process for selecting a supplemental information in accordance with various embodiments. Process 1000 may begin at step 1002. At step 1002, a category may be selected. In some embodiments, after a command, such as command 402, is received, a category (e.g., first party category servers 102, 104, 106 and/or third party category servers 112, 114, 116) may be selected to retrieve a response to the command. For example, if the command is "What is the weather like today?", weather category server 102 may be selected to retrieve a response to the command.

At step 1004, a query may be run to see if there are any categories related to the selected category. For example, as described above, related first party category rules 604 and/or related third party category rules 606 may be used to determine any related first or third party category servers that are related to the selected category server. If there are no categories determined to be related to the selected category, process 1000 may proceed to step 1006 where a response to the command is retrieved from the selected category. For example, in this scenario, no supplemental information may be provided with the response to the command.

If, however, at step 1004, it is determined that there are one or more related category servers to the selected category, then process 1000 may proceed to step 1008. At step 1008, the various related categories may be ranked according to how related they are to the selected category, response to the command from the selected category, and/or one or more preferences or settings of the individual having a registered account on cloud-based information system 100. The related categories may be ranked based on a variety of ranking parameters including, but not limited to, a frequency of use of a particular category server, a recently used category server, a relationship between the selected category server and a related category server, or any other criteria, or any combination thereof. In some embodiments, associated data received with the initial file may be used to rank the related categories. For example, based on a time or date that the command was made or received, certain related categories may be more useful for providing supplemental information than other categories. For instance, birthday third party category server 112 may be more useful in providing information if the date that the command was made or received equals the individual birthday stored in user profile module 318. As another example, a location of an individual making the command may be used to determine a related category to provide supplemental information.

After the related categories have been ranked, the top ranked category or top "N" ranked categories, where N may be any number greater than one, may be selected at step 1010. Based on the related category or categories that are selected, supplemental information module 330 may then retrieve supplemental information from the selected related category or categories at step 1012. The supplemental information may then be used in conjunction with the response retrieved from the selected category to create a message that will be sent back to voice-controlled electronic device 10. In some embodiments, retrieving supplemental information from the related category or categories may correspond to supplemental information database 150 retrieving the supplemental information from the top ranked related category server(s). In this particular example, supplemental information database 150 may update its database of supplemental information with supplemental information from related categories, such that, when a command is received, supplemental information database 150 may be capable of retrieving appropriate supplemental information, and appending it to a response to the received command.

Figure 11:
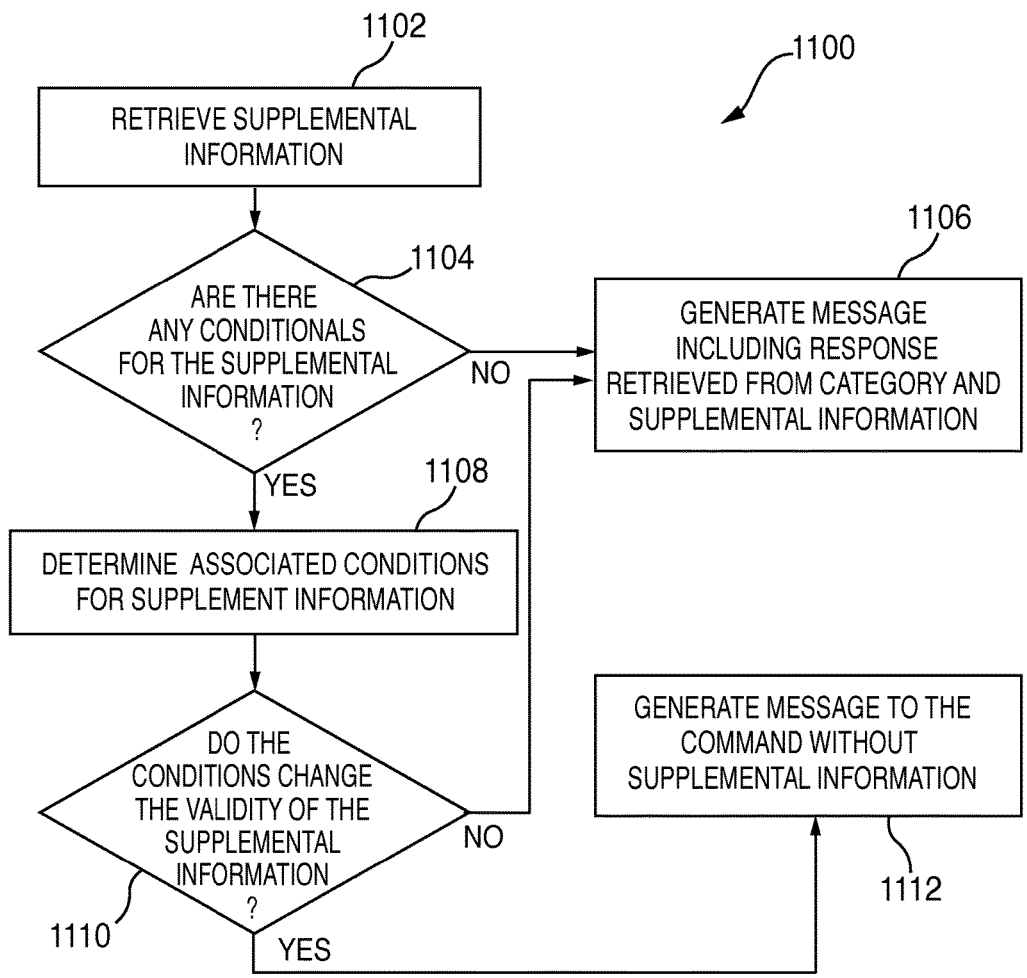
FIG. 11 is an illustrative flowchart of a process for generating messages based on conditionals associated with supplemental information in accordance with various embodiments.

FIG. 11 is an illustrative flowchart of a process for generating messages based on conditionals associated with retrieved supplemental information in accordance with various embodiments. Process 1100 may begin at step 1102. At step 1102, supplemental information for a command may be retrieved or selected from supplemental information database 150. In some embodiments, step 1102 of FIG. 11 may be substantially similar to step 506 of FIG. 5, and the previous description may apply.

At step 1104, a determination is made as to whether or not there are any conditionals for the supplemental information. In some embodiments, certain supplemental information may only be valid, and therefore useful to the individual, for a certain period of time or based on the individual's current location, a current time, or any other suitable criteria. For example, supplemental information retrieved from birthday third party server 112 may only be valid so long as the date the command was said is the same as the individual's birthday. If there are no other conditionals for the supplemental information, process 1100 may proceed to step 1106 where a message is generated including a response to the command retrieved from a selected category and the supplemental information.

If, however, at step 1104 it is determined that there are conditionals for the supplemental information, process 1100 may proceed to step 1108. At step 1108, it is determined if there are any associated conditions for the supplemental information in addition to the conditionals. For example, if supplemental information wishing an individual a happy birthday has already been provided, repeating that same information may not be useful. Therefore, in addition to a conditional being applied for birthday supplemental information if the date of the command (e.g., temporal data 406) equals the individual's birthday, a condition may also be applied that determines if the birthday supplemental information has already been appended to a response provided to the individual on a particular date.

At step 1110, at determination is made as to whether or not the associated condition changes the validity of the supplemental information. Continuing the example above, if it is determined that the birthday supplemental information has already been selected and the date of the command equals the date of the individual's birthday, then the validity of the supplemental information may change. This particular scenario may correspond to an individual who uses voice-controlled electronic device 10 to say a second command on their birthday. In this instance, the individual may have already received the supplemental information, "It is your birthday today! Happy Birthday!", and therefore may not be usefully served by receiving this information a second time.

If, at step 1110, it is determined that the validity of the supplemental information does not change due to the associated condition, process 1100 may proceed to step 1106. As an example of this particular scenario, the birthday supplemental information that is retrieved may not have been provided to the individual on that date, and therefore the associated condition does not change the validity of the birthday supplemental information. If, however, at step 1110, it is determined that the validity of the supplemental information does change, then process 1100 may proceed to step 1112 where a message is generated including a response to the command made, and without the supplemental information appended thereto. Still continuing the above example, if the birthday supplemental information has already been provided to the individual on the date of their birthday, then the birthday supplemental information may not be needed again, and therefore may not be included within the message generated in response to the inquiry.

FIG. 12 is an illustrative flowchart of a process for retrieving additional supplemental information in response to a flag that has been set in accordance with various embodiments. Process 1200 may begin at step 1202. At step 1202, supplemental information database 150 may retrieve supplemental information from one or more categories to be used in conjunction with a response to a command received by cloud-based information system 100. For example, supplemental information database 150 may obtain supplemental information from various categories on cloud-based information system 100. This supplemental information may selected based on the command made, the priority or urgency of the supplemental information, or setting of the individual's registered account on cloud-based information system 100.

At step 1204, a determination may be made as to whether or not a flag needs to be set for supplemental information database 150 to retrieve additional supplemental information from one or more category servers. In some embodiments, follow up information may be provided to further assist an individual. For example, an individual may ask for a reminder to be set to perform a task at a certain time. In response, a flag may be set to remind the individual to perform the task at the specified time. As an illustrative example, in response to retrieving movie times for a movie playing, an individual may purchase tickets using voice-controlled electronic device 10 and cloud-based information system 100. Based on the selected time of the movie, a flag may be set to remind the individual of the movie. However, if, at step 1204, no flag is needed to be set, supplemental information database 150 of cloud-based information system 100 may return to a standby mode, where it awaits a request from a command.

If at step 1204, it is determined that a flag is needed to be set for retrieving additional supplemental information, the flag may be set at step 1208. Continuing the example above, a flag may be set prior to the time that the movie is to begin. The flag may be used to remind the individual of the movie. At step 1210, additional supplemental information may be retrieved from supplemental information database 150 in response to the set flag. For example, the reminder for the movie may occur, and supplemental information module 330 may retrieve traffic information from traffic category server 106, and provide it to supplemental information database 150, such that it may be provided to the individual.

At step 1212, a message may be generated including the supplemental information, and the message may be sent to voice-controlled electronic device 10. For example, the message may inform the individual that there are delays on the way to the location where the movie is playing. Thus, the individual may be able to alter their plans to make sure they depart in enough time to make the movie. After the message is sent to voice-controlled device 10, process 1200 may return to step 1204 to determine if any more supplemental information should or could be provided. If not, process 1200 may proceed to step 1206 and remain in standby. However, if there is further supplemental information that may be retrieved, process 1200 may repeat steps 1208-1212 and provide the individual with further supplemental information.

The various embodiments of the invention may be implemented by software, but may also be implemented in hardware, or in a combination of hardware and software. The invention may also be embodied as computer readable code on a computer readable medium. The computer readable medium may be any data storage device which may thereafter be read by a computer system.

The above described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific feature are disclosed as illustrative forms of implementing the claims.

What is claimed is:

1. A method for sending supplemental information from an information system, the method comprising:
   receiving, from an electronic device, audio data representing speech;
   executing speech-to-text processing using the audio data to determine text data;
   determining a command from the text data, wherein the command is a request for information;
   determining a date that the audio data was received;
   receiving a response to the command from a server, wherein the response comprises the information;
   determining a user account associated with the audio data;
   selecting, from a supplemental information database and based at least in part on user information corresponding to the user account, first supplemental information corresponding to a first expiration date;
   selecting, from the supplemental information database and based at least in part on the user information, second supplemental information corresponding to a second expiration date;
   determining a first difference between the date and the first expiration date;
   determining a second difference between the date and the second expiration date;
   determining that the first difference is less than the second difference;
   generating, based at least in part on determining the first difference is less than the second difference, output text data that represents the information and the first supplemental information;
   generating output audio data representing the output text data; and
   sending the output audio data to the electronic device.

2. The method of claim 1, further comprising:
   determining that an event stored in association with the registered account occurs on the date, wherein selecting the supplemental information further comprises:
      choosing supplemental information that is related to the event, wherein:
         the supplemental information comprises a message corresponding to the event.

3. The method of claim 1, further comprising:
   determining that the supplemental information is urgent; and
   arranging the supplemental information to be prior to the information in the output audio data.

4. The method of claim 1, further comprising:
   determining that the supplemental information is non-urgent; and
   arranging the information to be prior to the supplemental information in the output audio data.

5. A method comprising:
   receiving, at a first time, audio data representing speech;
   receiving metadata associated with the audio data;
   determining a user account associated with the audio data;
   selecting, based at least in part on the metadata and information corresponding to the user account, first supplemental information and second supplemental information;
   determining a first expiration time corresponding to the first supplemental information;
   determining a second expiration time corresponding to the second supplemental information;
   determining a first time difference between the first time and the first expiration time;
   determining a second time difference between the first time and the second expiration time;
   determining that the first time difference is less than the second time difference;
   generating, based at least in part on determining the first time difference is less than the second time difference, output data representing the first supplemental information and response data corresponding to the audio data; and
   sending the output data to a user device.

6. The method of claim 5, further comprising:
   determining a command from the audio data;
   selecting a server from a plurality of servers; and
   retrieving, from the selected server, response data corresponding to the command,
   wherein selecting the supplemental information is further based on at least one of the response data and the server.

7. The method of claim 5, wherein selecting the supplemental information further comprises:
   selecting the supplemental information from a supplemental information database, wherein:
      the supplemental information database comprises pieces of supplemental information that are related to the user account; and
      the pieces of supplemental information are deleted from the supplemental information database in accordance with an expiration time.

8. The method of claim 5, wherein the output data comprises at least one of:
   audio data representing the response data and the supplemental information; or
   video data representing the response data and the supplemental information.

9. The method of claim 5, wherein receiving the metadata comprises at least one of:
   receiving a time that the audio data was received; or
   receiving a location of a requesting device that sent the audio data.

10. The method of claim 5, wherein the audio data representing speech comprises a command and selecting the supplemental information further comprises:
    selecting the supplemental information based on the command.

11. The method of claim 5, wherein selecting the supplemental information is further based at least in part on an association between a first server associated with the response and a second server associated with the supplemental information.

12. The method of claim 5, further comprising:
    determining a server associated with the response; and
    selecting additional supplemental information associated with the server, wherein the output media further represents the additional supplemental information.

13. The method of claim 5, wherein selecting the supplemental information further comprises:

determining first information based at least in part on the metadata and information corresponding to the user account;

determining second information based at least in part on the metadata and information corresponding to the user account;

determining a first ranking corresponding to the first information;

determining a second ranking corresponding to the second information;

based at least in part on determining the first ranking is greater than the second ranking, selecting the first information as the supplemental information.

14. A system comprising:

at least one processor; and at least one memory including instructions that, when executed by the at least one processor, cause the system to:
- receive, at a first time, audio data representing speech;
- receive metadata associated with the audio data;
- determine that the audio data is associated with a user account;
- select, based at least in part on the metadata and user information corresponding to the user account, first supplemental information and second supplemental information;
- determine a first expiration time corresponding to the first supplemental information;
- determine a second expiration time corresponding to the second supplemental information;
- determine a first time difference between the first time and the first expiration time;
- determine a second time difference between the first time and the second expiration time;
- determine that the first time difference is less than the second time difference;
- generate, based at least in part on determining the first time difference is less than the second time difference, output data comprising the first supplemental information and response data corresponding to the audio data; and
- send the output data to a user device.

15. The system of claim 14, wherein the at least one memory further stores at least one of preference data, settings data, or history data corresponding to previously received audio data.

16. The system of claim 14, wherein the at least one memory further comprises instructions that, when executed by the at least one processor, further cause the system to:
- determine a command from the audio data; and
- select a server from a plurality of servers, wherein the server that is selected is related to the command.

17. The system of claim 16, wherein the at least one memory further comprises instructions that, when executed by the at least one processor, further cause the system to:
- obtain the response data from the server.

18. The system of claim 14, wherein the metadata comprises at least one of:
- a time that the audio data was received; and
- a location of a requesting device that sent the audio data.

19. The method of claim 5, further comprising:
- determining a first priority of the response data;
- determining a second priority of the supplemental information;
- determining the second priority is greater than the first priority; and
- arranging the supplemental information to be prior to the response in the output data.

20. The system of claim 14, wherein the at least one memory further comprises instructions that, when executed by the at least one processor, further cause the system to:
- determine a first priority of the response data;
- determine a second priority of the supplemental information;
- determine the second priority is greater than the first priority; and
- arrange the supplemental information to be prior to the response in the output data.

* * * * *